(12) United States Patent
Inoue

(10) Patent No.: US 7,545,968 B2
(45) Date of Patent: Jun. 9, 2009

(54) IMAGE PROCESSING APPARATUS

(75) Inventor: Hitoshi Inoue, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 438 days.

(21) Appl. No.: 11/271,881

(22) Filed: Nov. 14, 2005

(65) Prior Publication Data

US 2006/0067590 A1     Mar. 30, 2006

Related U.S. Application Data

(62) Division of application No. 10/041,447, filed on Jan. 10, 2002, now Pat. No. 7,003,147.

(30) Foreign Application Priority Data

| Jan. 12, 2001 | (JP) | ............................. 2001-005572 |
| Jan. 12, 2001 | (JP) | ............................. 2001-005573 |

(51) Int. Cl.
   *G06K 9/00*   (2006.01)
   *H05G 1/70*   (2006.01)
   *H01L 27/146*  (2006.01)

(52) U.S. Cl. ..................... 382/132; 378/92; 250/370.09

(58) Field of Classification Search ......... 382/128–134, 382/162, 168, 235, 307, 317; 378/4, 6, 21–27, 378/94, 901, 92, 98.4, 98.6, 140, 185; 600/407, 600/410, 411, 412, 425, 310, 473, 556; 250/208.4, 250/336.1, 366, 370.09; 710/69
See application file for complete search history.

(56) References Cited

U.S. PATENT DOCUMENTS 5,028,991 A    7/1991  Sekizawa et al. ............ 358/537
5,181,104 A    1/1993  Sugishima et al. .......... 358/500
5,940,192 A    8/1999  Ichikawa et al. ............ 358/530
6,084,939 A *  7/2000  Tamura ...................... 378/98.2
6,175,406 B1   1/2001  Iizuka et al. ................... 355/75
6,546,052 B1   4/2003  Maeda et al. .......... 375/240.08
6,831,634 B1 * 12/2004 Shigeta ........................ 345/213
2002/0159633 A1 10/2002 Inoue ........................... 382/170

FOREIGN PATENT DOCUMENTS

| EP | 0 875 857   | 5/2000  |
| EP | 1 176 553   | 1/2002  |
| JP | 11-55558    | 2/1999  |
| JP | 11-234501   | 8/1999  |
| JP | 2000 132663 | 12/2000 |

OTHER PUBLICATIONS

Busko I., "Quadrant DC Offset Removal in NICMOS Images Using an Eye-pleasing Criterion" *Astronomical Data Analysis Software and Systems VIII, ASP Conference Series*, vol. 172, pp. 341 to 344 (1999).

* cited by examiner

*Primary Examiner*—Abolfazl Tabatabai
(74) *Attorney, Agent, or Firm*—Fitzpatrick, Cella Harper & Scinto

(57) ABSTRACT

An image processing apparatus includes an image processing circuit having a first mode that corrects an offset between a first image and a second image that are adjacent to each other to synthesize the first image and the second image into a new third image, and a second mode that corrects an offset between the third image and a fourth image that are adjacent to each other to synthesize the third image and the fourth image into a new fifth image.

5 Claims, 17 Drawing Sheets

FIG. 9

| q | | COEFFICIENT OF x(n-2) | COEFFICIENT OF x(n-1) | COEFFICIENT OF x(n) | x(n+1) | COEFFICIENT OF x(n+2) | COEFFICIENT OF x(n+3) | COEFFICIENT OF x(n+4) |
|---|---|---|---|---|---|---|---|---|
| 0 | DIFFERENTIAL | | -2/4/3 | 2/4/3 | | -2/4/3 | 2/4/3 | |
|   | STEP | -2/2/4/3 | | 2/2/4/3 | | -2/2/4/3 | | 2/2/4/3 |
|   |  | | 1/3 | 1/3 | | -1/3 | | |
| 1 | DIFFERENTIAL | -4/2/4/3 | -4/4/3 | 4/4/3 | | -4/4/3 | 4/4/3 | |
|   | STEP |  | 1/3 | 4/2/4/3 | | -4/2/4/3 | | 4/2/4/3 |
|   |  |  |  |  |  |  | -1/3 | |
| 2 | DIFFERENTIAL | -6/2/4/3 | -6/4/3 | 6/4/3 | | -6/4/3 | 6/4/3 | |
|   | STEP | 1/3 |  | 6/2/4/3 | | -6/2/4/3 | | 6/2/4/3 |
|   |  |  |  |  |  |  |  | -1/3 |
| TOTAL SUM | | c(-2)=-1/6 | c(-1)=-2/3 | c(0)=11/6 | c(1)=0 | c(2)=-11/6 | c(3)=2/3 | c(4)=1/6 |

IMAGE PROCESSING APPARATUS

This application is a divisional of U.S. patent application Ser. No. 10/041,447, filed Jan. 10, 2002, the contents of which are incorporated by reference herein.

BACKGROUND OF THE INVENTION

1. Field of the Invention

The present invention relates to a technique for synthesizing a plurality of images into one image.

2. Related Background Art

Up to now, for example, as an x-ray sensing apparatus that creates an image from the amount of x-rays that have passed through the interior of an object to be sensed (the interior of a human body, etc.), there has been proposed a device in which a spatial distribution of the intensity of the x-rays that have passed through the object to be sensed is converted directly into an electric signal by a large-sized x-ray sensor panel, and the electric signal is converted into a digital value through analog-to-digital (A/D) conversion so that the x-ray image of the object to be sensed is available to image saving, image processing, image observation or the like as a digital image.

As the above-mentioned x-ray sensor panel, for example, in the case where the object to be sensed is a chest region of a human body, and the chest region of the human body is going to be sensed with x-rays all at once, there is employed a sensor panel that is about 40 cm×40 cm in size. The x-ray sensor panel of this size is brought substantially in contact with the chest region of the human body, and x-rays are irradiated onto the x-ray sensor panel from a direction facing the human body, to thereby obtain a digital image based on the intensity distribution of the x-rays that have passed through the chest region of the human body by one x-ray sensing.

Also, in the case where the fine structure of the human body is going to be sensed with x-rays, there is used an x-ray sensor panel having pixel resolution about 0.1 to 0.2 mm. In this case, the x-ray sensor panel becomes very large-sized to the degree of 2000×2000 pixels to 4000×4000 pixels.

As a method of reading image information from the above-mentioned large-sized x-ray sensor panel at high speed and with stability, there are proposed, for example, the following two methods.

(1) Relatively small-sized segment sensor panels are combined together in the form of tiles to constitute one large-sized sensor panel. The respective sensor panels are driven concurrently, and image information (electric signal) resultantly obtained is digitalized by an A/D converter.

(2) In order to collect the image information at high speed or to shorten substantial information wiring length on a sensor panel, a sheet of large-sized sensor panel is divided into sub-parts and driven, and image information (electric signal) resultantly obtained in each divided sub-part is digitalized by amplifiers and A/D converters which are disposed independently.

However, in the above-mentioned conventional x-ray sensing apparatuses, when the sensor panel is driven by not a single system but a plurality of systems independent from each other to collect the x-ray image information of the object to be sensed as in the above-mentioned manners (1) and (2), the characteristics of the amplifiers, the A/D converters, etc., which process the electric signals which are outputs of the respective segment panels, fluctuate independently (a change due to the environments, a change with a time and so on). This leads to the following problems.

For example, in the case where a single sensor panel is divided into four parts, and the respective segment panels are driven independently, when the x-rays that have passed through the object to be sensed are entered to the sensor panel, the electric signals that are outputted from the four segment panels of the sensor panel are digitalized by the amplifiers and the A/D converters which are independent from each other, and then temporarily saved as the four segment image data.

In this situation, the four segment panels of the sensor panel are driven under control in synchronization with a timing where the x-rays are irradiated to the object to be sensed.

Then, the same operation as the above-mentioned sensing operation is conducted under a condition where no x-rays are irradiated, thereby saving data of a fixed pattern such as offset.

In this situation, data related to a variation in the gains of the respective pixels in the four segment panels of the sensor panel is stored in the memory in advance. That information is generated by irradiating the x-rays toward the sensor panel in a state where there exists no object to be sensed, and acquiring the image information.

Then, the fixed pattern data saved in the memory is subtracted from the four segment image data acquired in advance, and further, correction for each of the pixels is conducted due to the gain variation data.

Here, the gain variation data for each of the pixels is obtained by irradiating the x-rays in a state where no object to be sensed exists. For example, in a normal medical spot, since it is very difficult to acquire the gain variation data for every x-ray sensing, the gain variation data is acquired by the x-ray sensing once a day.

Also, the fixed pattern data is acquired at a time that is very close to the x-ray sensing time, but not at the same time as the x-ray sensing time.

The above-mentioned time difference in the data acquirement may results in change of the environments (temperature, humidity or the like) where the data is acquired, and thus leads to the possibility that change may occur in the characteristic of the sensor panel, the amplifiers disposed for the four segments of the sensor panel, or the like.

For that reason, different characteristics appear for each of the segment images, and a definite boundary appears between the segment images.

Therefore, in order to solve the above-mentioned problem, there has been proposed in Japanese Patent Application Laid-open No. 2000-32663, for example, a structure in which a component having a characteristic continuous in a boundary direction in the vicinity of the boundary of the above-mentioned segment images is extracted, and the characteristic component is removed. According to this structure, in the case where the variation of the segment image is relatively small, it is very effective in solving the above problem, only the boundary portion can be smoothed, and as the result, correction is not required over the entire image.

However, in the above-mentioned structure, there is a case where the amount of correction becomes large, and a sense of incongruity over the image as a whole cannot be removed by only the partial correction. Also, in the-case where the important image information exists along the boundary in the vicinity of the boundary of the segment images, there occurs such a problem that the image information is damaged.

SUMMARY OF THE INVENTION

It is an object of the present invention to eliminate variation among images to thereby obtain satisfactory images when a plurality of images are synthesized to form a single image.

In order to attain the above object, according to an embodiment of the present invention, there is provided an image processing apparatus comprising: an image processing circuit having a first mode that corrects an offset between a first image and a second image that are adjacent to each other to synthesize the first image and the second image into a new third image, and a second mode that corrects an offset between the third image and a fourth image that are adjacent to each other to synthesize the third image and the fourth image into a new fifth image.

According to another embodiment, there is provided an image processing method comprising the steps of: correcting an offset between a first image and a second image that are adjacent to each other to synthesize the first image and the second image into a new third image; and correcting an offset between the third image and a fourth image that are adjacent to each other to synthesize the third image and the fourth image into a new fifth image.

According to a still another embodiment, there is provided a storage medium that stores program therein, the program comprising a code of a step of correcting an offset between a first image and a second image that are adjacent to each other to synthesize the first image and the second image into a new third image, and a code of a step of correcting an offset between the third image and a fourth image that are adjacent to each other to synthesize the third image and the fourth image into a new fifth image.

According to a still another embodiment, there is provided an image processing apparatus, comprising a correcting circuit which obtains a correction value of a step between a plurality of partial images for every partial image on the basis of statistic property of a pixel value in boundary portions between the plurality of partial images, and corrects the plurality of partial images on the basis of the correction value in order to constitute a single image from the plurality of partial images.

According to a still another embodiment, there is provided an image processing method comprising the steps of: obtaining a correction value of a step between a plurality of partial images for every partial image on the basis of statistic property of a pixel value in a boundary portions between the plurality of partial images; and correcting the plurality of partial images on the basis of the correction value in order to constitute a single image from the plurality of partial images.

According to a still another embodiment, there is provided a storage medium that stores program therein, the program comprising a code of a step of obtaining a correction value of a step between a plurality of partial images for every partial image on the basis of statistic property of a pixel value in a boundary portions between the plurality of partial images, and a code of a step of correcting the plurality of partial images on the basis of the correction value in order to constitute a single image from the plurality of partial images.

Another objects and characteristics of the present invention will be apparent from the following specification and figures.

BRIEF DESCRIPTION OF THE DRAWINGS

FIG. 9 is a diagram for explaining a table used in acquiring the substantial step of the segment images;

DETAILED DESCRIPTION OF THE PREFERRED EMBODIMENTS

Now, a description will be given of preferred embodiments of the present invention with reference to the accompanying drawings.

Figure 1:
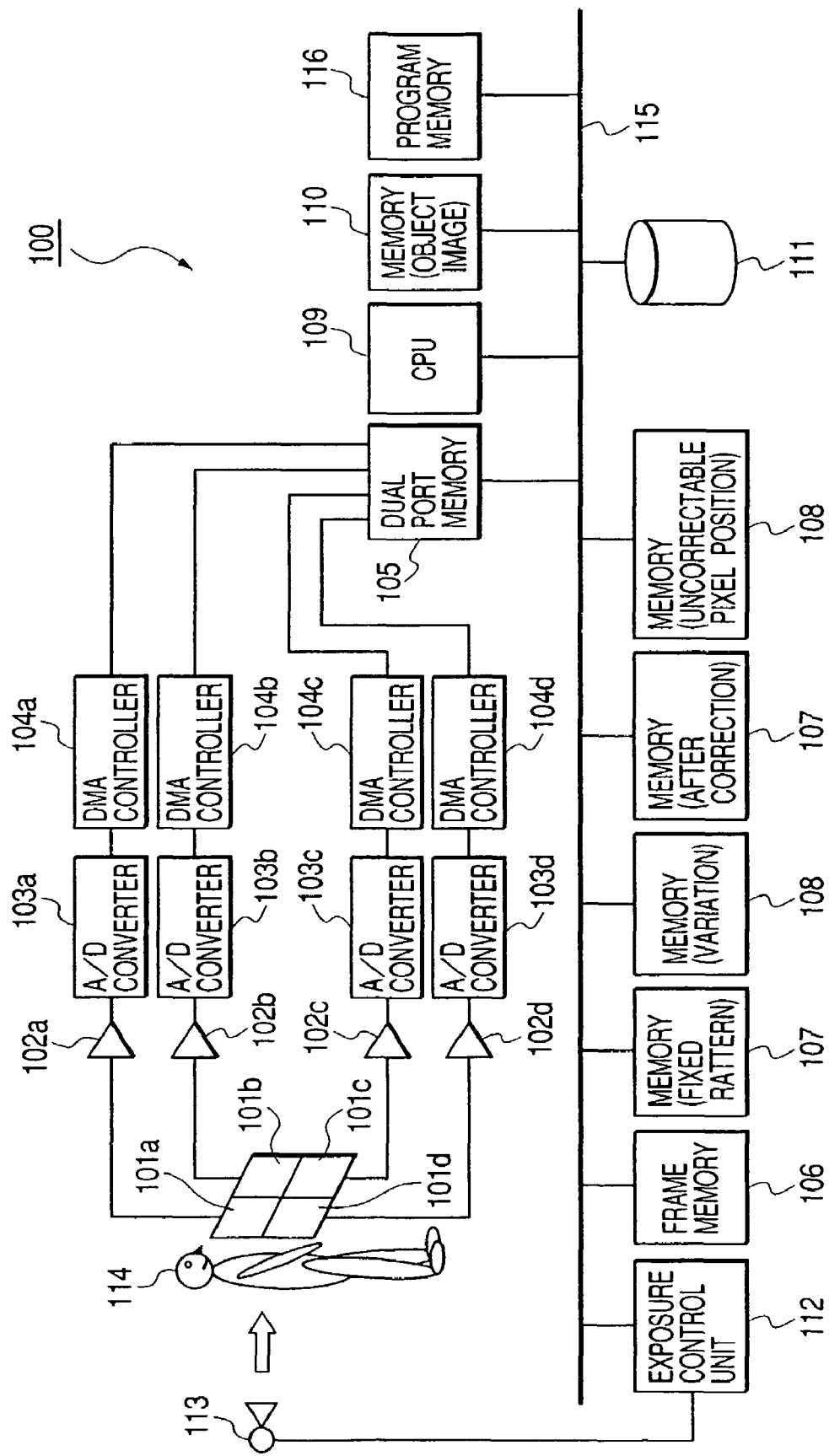
FIG. 1 is a block diagram showing the structure of an x-ray sensing apparatus to which the present invention is applied in a first embodiment.

In a first embodiment, the present invention is applied to, for example, an x-ray sensing apparatus 100 shown in FIG. 1.

Prior to the specific description of the x-ray sensing apparatus 100 in this embodiment, a characteristic function implemented by the x-ray sensing apparatus 100 will be described.

The x-ray sensing apparatus 100 is an apparatus that is so designed as to acquire a single image from the assembly of a plurality of segment images that are acquired by divisionally driving a sheet of sensor panel, and particularly has a function of selecting two adjacent segment images from the plurality of segment images, adjusting the offset between those segment images to form one new portion, and repeatedly executing such a process to unify these segment images into one final image in which the boundary is not visible.

Hereinafter, the characteristic function of the x-ray sensing apparatus 100 will be specifically described.

Figure 2:
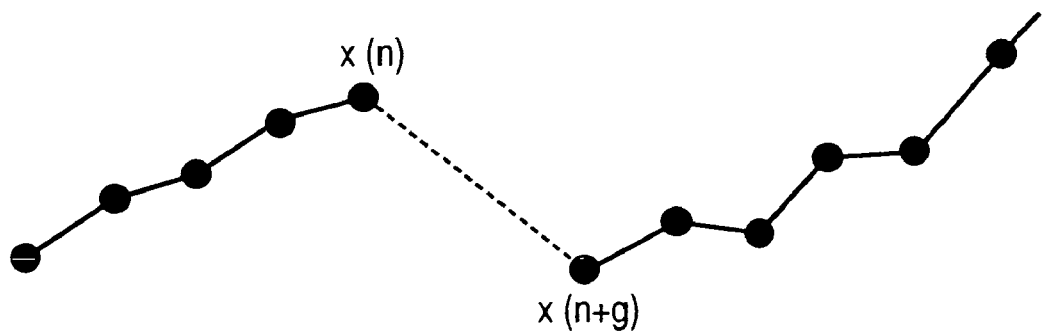
FIG. 2 is a diagram for schematically explaining the appearance of a step of segment images one-dimensionally.

(1) First, a substantial step value of the boundary of the segment images is acquired as follows:

Paying attention to the one-dimensional direction of the image, it is assumed as shown in FIG. 2 that there exists a gap of g pixels between a segment image 1 and a segment image 2 adjacent to the segment image 1, and it is also assumed that the pixel value of the segment image 1 is x(0), x(1), ..., x(n), and the pixel values of the segment image 2 is x(n+g), x(n+g+1), ...

Also, because the segment image 1 and the segment image 2 are both segment images resulting from x-ray-sensing of the object to be sensed by divisionally driving a sheet of sensor panel, an error exists in the offset value between the pixel n of the segment image 1 and the pixel (n+g) of the segment image 2, and there is the possibility that the error is recognized as a step.

However, because both of the segment images are obtained by sensing the same object to be sensed, the pixel n of the segment image 1 and the pixel (n+g) of the segment image 2 have a relationship that the inclination is continuous. Therefore, the average of an inclination obtained from the pixel values x(0), x(1), ..., x(n) of the segment image 1 and an inclination obtained from the pixel values x(n+g), x(n+2), ... of the segment image 2 is now defined as an inclination "K" of the object image information.

A difference across the boundary of the pixel value x(i+p) of the segment image 1 and the pixel value x (i+p) of the segment image 2 is x(i+p)–(i). The inclination is the above-mentioned "K", and an expected difference is "pK", and a difference between the pK value and the value of x(i+p)–x(i) becomes an expected value (difference value) d of the substantial step. That is, the substantial step value d of the boundary of each of the segment images 1 and 2 is obtained by the following expression (1):

$$d = PK - x(i+P) + x(i) \quad (1)$$

As a method of obtaining the step value d, there are various methods dependent on manners of obtaining a differential value besides the above-mentioned method. One example of those methods is described below.

For example, the inclination of the segment image 1 is obtained using the pixel value x(n) as a reference, and the inclination of the segment image 2 is obtained using the pixel value x(n+g) as a reference. The respective inclinations are averaged by using the pixel value of a point m to obtain the inclination K.

In this case, the inclination K is represented by the following expression (2).

$$K = \frac{1}{2m}\left[\sum_{p=1}^{m}\frac{1}{p}(x(n) - x(n-p)) + \sum_{p=1}^{m}\frac{1}{p}(x(n+g+p) - x(n+g))\right] \quad (2)$$

Also, differences across the boundary of the pixel value x(i+p) of the segment image 1 and the pixel value x(i) of the segment image 2 are considered as symmetry with respect to the boundary so as to be x(n+g)–x(n), x(n+g+1)–x(n–1), x(n+g+2)–x(n–2), ..., x(n+g+m)–x(n–m).

In this case, the substantial step value d of the boundary of each of the segment images is represented by the following expression (3).

$$d = \frac{1}{m+1}\sum_{q=0}^{m}\{(g+2q)K - x(n+g+q) + x(n+q)\} \quad (3)$$

The substantial step value d on a line that is cross one boundary can be obtained through the above-mentioned calculation process. Also, the calculation process is intensive to the calculation process of accumulative addition that makes accumulation by substantially multiplying the pixel value by a predetermined coefficient.

Here, because a plurality of lines (0 to L) exist in the image, there is actually obtained the substantial step value line d(i) (i=0 to L) which is continuous on one boundary. Also, because a plurality of boundaries between one segment image and other adjacent segment images exist in the segment image, a plurality of step value lines d(i) exist for one segment image.

In this example, a change in the pixel value with respect to the segment image (object segment image) to be processed is statistically obtained from such a step value line d(i).

Various methods are applicable to this processing method depending on the modes of the object segment image and should be used case by case.

Figure 3:
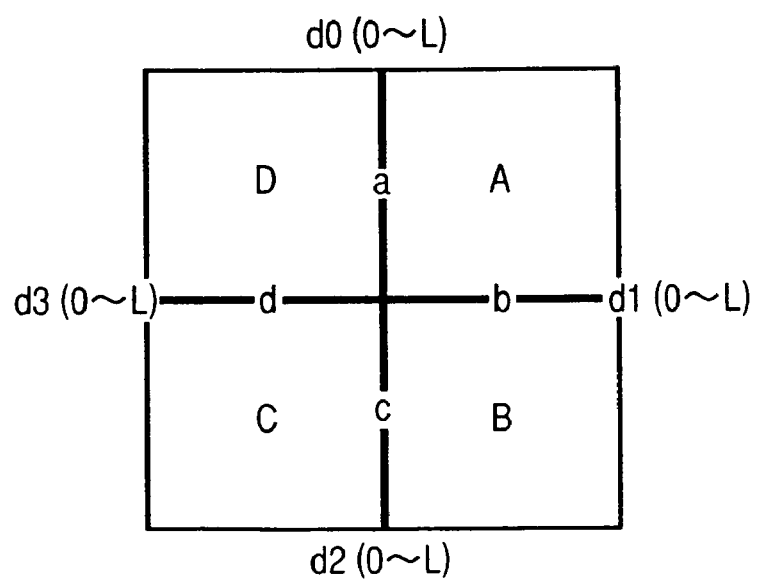
FIG. 3 is a diagram for explaining four segment images.

As one example thereof, for example, in the case where a single sensor panel is divided into four segments and driven, as shown in FIG. 3, four segment images A, B, C and D are connected in the form of a matrix. In this example, the boundaries are represented by four boundaries a, b, c and d shown in FIG. 3. As to the respective boundaries a, b, c and d, it is assumed that the step values obtained with the above-mentioned method are d0(0 to L–1), d1(0 to (L–1)), d2(–1 to –(L–1)) and d3(–1 to –(L–1)).

In this example, the image center is an origin, and the position is represented by "±".

In this case, if the data of the segment images A, B, C and D is in proportion to the x-ray intensity, the step values d0(0 to L–1), d1(0 to (L–1)), d2(–1 to –(L–1)) and d3(–1 to –(L–1)) correspond to the offset value. Therefore, in this case, with the execution of the logarithmically converting process, the step values d0(0 to L–1), d1(0 to (L–1)), d2(–1 to –(L–1)) and d3(–1 to –(L–1)) correspond to a variation in the gain.

As a correcting method using the step values d0(0 to L–1), d1(0 to (L–1)), d2(–1 to –(L–1)) and d3(–1 to –(L–1)), that is, the variation in the gain, there are proposed various methods depending on the situation, and as one example thereof, a correcting method which conducts the correction to the partial images A, B, C and D with addition/subtraction of a constant value, will be described below.

In the case of using the constant value, the step values d0(0 to L–1), d1(0 to (L–1)), d2(–1 to –(L–1)) and d3(–1 to –(L–1)) at the boundaries a, b, c and d are consolidated into one certain value. For that reason, values D0, D1, D2 and D3 are derived from the step values d0(0 to L–1), d1(0 to (L–1)), d2(–1 to –(L–1)) and d3(–1 to –(L–1)) one by one, respectively.

Figure 4A:
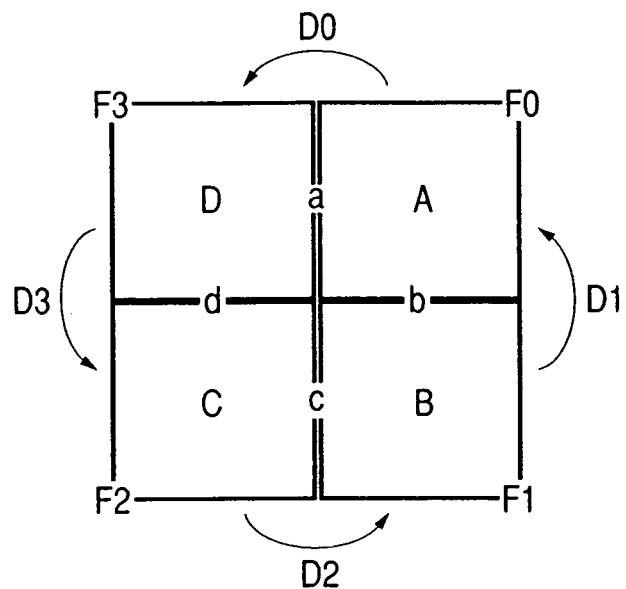
FIGS. 4A, 4B and 4C are diagrams for schematically explaining an example of a method of unifying the segment images.

As a method of deriving the values D0, D1, D2 and D3, there is a method in which the respective average values of the step values d0(0 to L–1), d1(0 to (L–1)), d2(–1 to –(L–1)) and d3(–1 to –(L–1)) are obtained as the values D0, D1, D2 and D3. However, if correction is not conducted averagely but conducted in a range as wide as possible, for example, as shown in FIG. 4A, a maximum frequency value (the peak of histogram) is used as the values D0, D1, D2 and D3.

It is needless to say that the following expression is satisfied:

$$D0+D1+D2+D3=0$$

However, due to an error in calculation, an influence of image noises, an unstable offset value and so on, it is necessary to generally apply the following expression:

$$D0+D1+D2+D3=\epsilon(\neq 0)$$

This is an inconsistency resulting from obtaining the respective values independently.

In order to eliminate the above inconsistency, first, correction is made so as to satisfy a correction value F0=0 and a correction value F3=−D0 by using the step value D0 in FIG. 4A. As a result, the partial image A and the partial image D are regarded as one partial image AD without any step. In this situation, there is a case in which a smaller value is referenced so that a negative value is not added.

Also, correction is made so as to satisfy F2= and F5=−D4 in the same manner, as a result of which a step of the partial image B and the partial image C is eliminated, and the partial image G and the partial image C are regarded as one partial image BC.

Figure 4B:
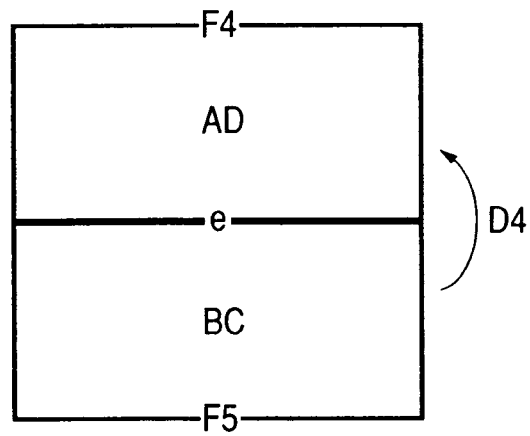

Therefore, as shown in FIG. 4B, a linear boundary is defined between the partial image AD and the partial image BC. Then, in that boundary, a step value line d4(−L to L) is newly calculated, thereby obtaining the correction value D4 as its representative value.

Then, the correction value F4=0 and the correction value F5=−D4 are newly added to the partial image AD and the partial image BC.

Figure 4C:
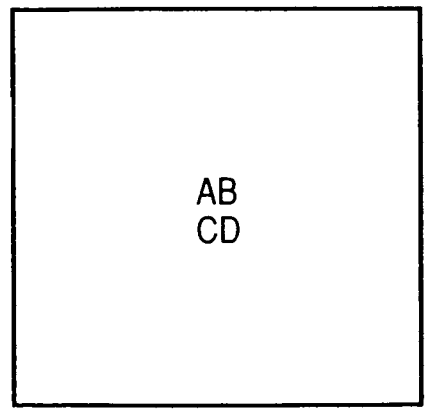

Then, the entire image is structured by the partial image AD and the partial image BC as shown in FIG. 4C. As a result, the inconsistency caused by only one calculation of a step value is prevented, and the partial images are synthesized without any inconsistency.

In the case where three or more partial images exist, the steps are corrected with respect to each of two partial images which are regarded as independent partial images, to constitute one new partial image, and the calculation of the step value with respect to the new partial image is repeatedly executed.

As described above, in the process of putting those two partial images into one partial image, without correcting only the predetermined step value, the step value sequence are fitted by a function with a low degree of freedom, thereby being applicable to a case in which the interior of the partial images are not a constant offset error.

That is, in FIG. 3, assuming that the axis of ordinate is "y" and the axis of abscissas is "x", and the step value sequence d0(0 to L−1) and d2(0 to L−1) are fitted by the function that is small in the degree of freedom, respectively, the statistic step values are obtained. It is assumed that the functions at this time (the function that conducts the fitting) are d0'(y) and d2'(y), and the center of the entire image is an origin.

In this case, because the offset is constant over the entire surface, and there is no partial image of "0", that is, there exists no partial image to be referenced, correction is made with respect to all of the partial images. Also, if correction that is not an even plane is added (shirring is conducted) with respect to only any one partial image, because there is a risk of the image density being greatly deformative, the correction is divided to the respective partial images half by half.

In FIG. 3, the step values are shared to the respective faces such that the correction value when viewing the partial image A from the boundary a is "d0'(y)/2", and the correction value when viewing the partial image D is "−d0'(y)/2".

As a result, the function F0'(x,y) used when correcting the partial image A becomes a two-dimensional function, which is represented by the following expression:

$$F0'(x,y)=d0'(y)/2 \quad (4)$$

Similarly, the functions of other partial images are represented by the following expressions (5) to (7).

$$F3'(x,y)=-d0'(y)/2 \quad (5)$$

$$F1'(x,y)=-d2'(y)/2 \quad (6)$$

$$F3'(x,y)=d2'(y)/2 \quad (7)$$

The functions for correction is obtained in the above-mentioned manner to correct the partial images by adding the function values to the respective partial images. This correction enables the new partial image AD and the partial image BC to be obtained even if the offset steps of the partial images A, B, C and D are not constant within the partial images.

Under the above circumstances, as shown in FIG. 4B, the substantial step value sequence d4(−L to L) are calculated with respect to the boundary e between the new partial image AD and the partial image BC and then subjected to the function fitting, to thereby obtain the statistic step value d4'(x). Then, F4'(x,y) is added to the new partial image AD, and F5'(x,y) is added to the partial image BC, to thereby eliminate the step between the partial image AD and the partial image BC and produce one image.

In this situation, F4'(x,y) and F5'(x,y) are represented by the following expressions (8) and (9):

$$F4'(x,y)=d4'(y)/2 \quad (8)$$

$$F5'(x,y)=-d4'(y)/2 \quad (9)$$

The above-mentioned process is a correcting process for the two-dimensional image, but in the correcting process, a one-dimensional function is employed.

Incidentally, generally, when a variation which is not constant within the partial image is corrected in the case where the partial images are coupled together, it is preferable that the boundary portion of the partial image is linear in a certain direction (x-direction or y-direction).

Figure 5:
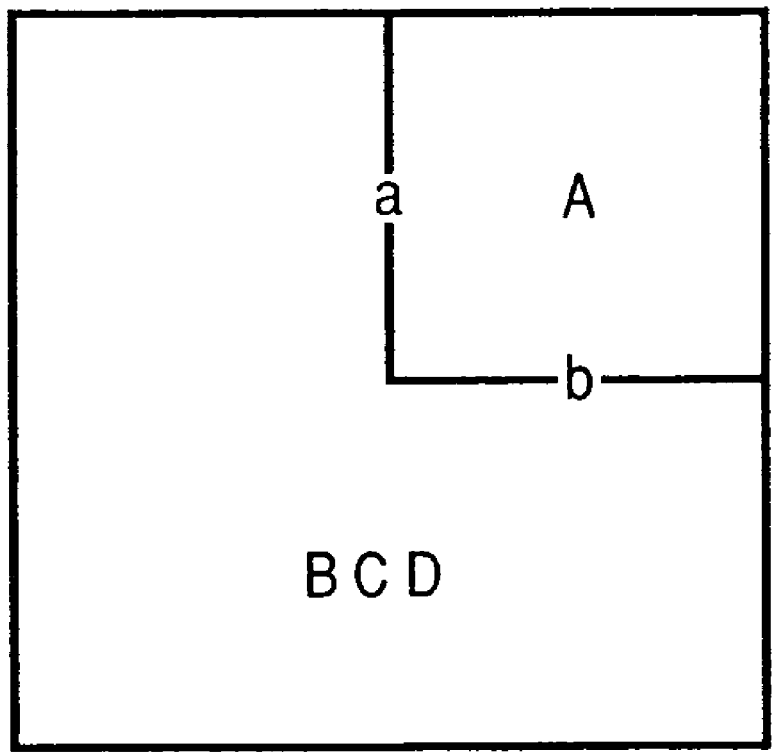
FIG. 5 is a diagram for schematically explaining an unpreferred example of final two segment images in the method of unifying the segment images.

For example, the boundaries a and b shown in FIG. 3 are the boundaries of the partial image A, and even if other partial images B, C and D are coupled together so as to be regarded as a new partial image BCD as shown in FIG. 5, it is necessary to process the boundaries a and b as a series of steps. For that reason, it is necessary to fit the steps by one function or to fit the respective steps taking into consideration the bonding condition that makes two functions continuous. In addition, the two-dimensional function is structured by the above fitting and must be converted to a correction value to the partial image A. Also, as shown in FIG. 5, in the boundaries a and b in the different directions, the step series different in shape is liable to be produced due to the characteristic of the sensor.

Accordingly, the partial image are sequentially selected so as to prevent the shape shown in FIG. 5, and the selected partial images thus obtained are sequentially unified. Then, when two partial images are finally obtained, their boundary is made linear.

Then, a process for not giving a user (observer) a sense of incongruity that the single entire image are the collection of a plurality of partial images A, B, C and D, is executed as follows:

First, because the above process is a process for the vicinity of the boundaries a, b, c and d of the partial images A, B, C and D, there is applicable a method in which the components having the characteristic that is continuous in the boundary direction in the vicinity of the boundary are extracted with respect to the boundaries a, b, c and d, and the above characteristic components are removed in the vicinity of the boundary to make the boundaries a, b, c and d unvisible as disclosed in, for example, Japanese Patent Application Laid-open No.

2000-132663 or the like. However, there is a case in which a problem arises in a specific image.

Figure 6A:
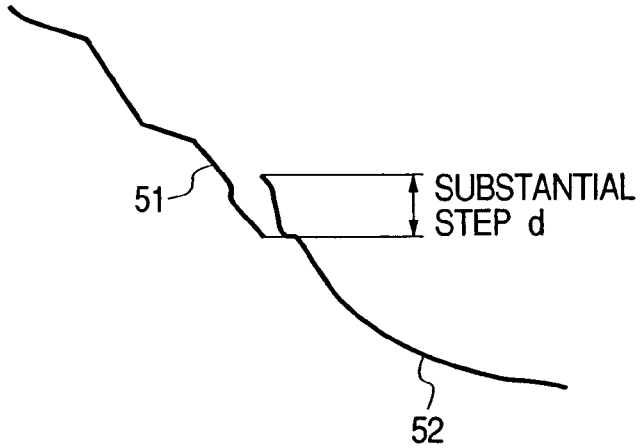
FIGS. 6A, 6B and 6C are diagrams for schematically explaining an example of a method of repairing a boundary portion of the segment images.

For example, FIG. 6A schematically shows a state where attention is paid to two partial images (partial image 1 and partial image 2) among the partial images A, B, C and D, and the substantial boundary step of those partial images remain.

In FIG. 6A, reference numeral 51 denotes a section of the partial image 1, and 52 denotes a section of the partial image 2. Those lines 51 and 52 is provided with the moving average of some degree in the boundary direction and show the shapes of the steps.

Figure 6B:
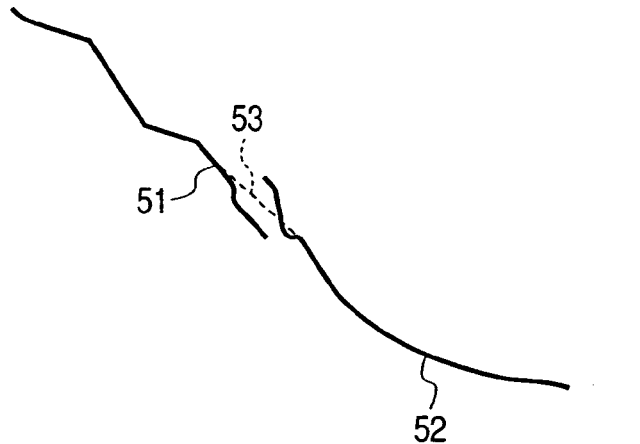

FIG. 6B shows a state of the boundary in the case where the components having the characteristic continuous in the boundary direction in the vicinity of the boundary are extracted with respect to the boundary of the partial image 1 and the partial image 2 to remove the characteristic components in the vicinity of the boundary so as to make the boundary unvisible through a method disclosed in Japanese Patent Application Laid-open No. 2000-132663 or the like.

In FIG. 6B, assuming that there is no fine image variation in parallel with the boundary direction, a repair is made as indicated by 53. However, as shown in FIG. 6B, because the fine variation remains in the moving-averaged data in the boundary direction, the fine image variation occurs in parallel with the boundary direction, and information on that portion is lost.

Figure 6C:
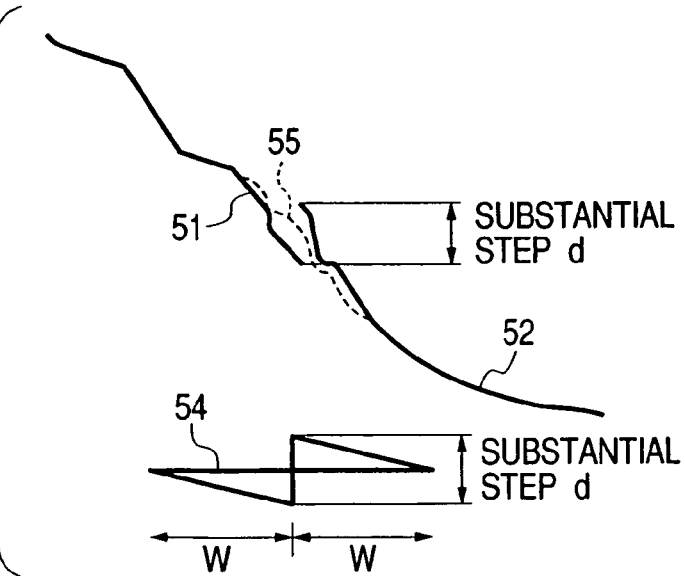

FIG. 6C shows a state where a smooth (linear in the figure) correction component is added to only W front and rear pixels of steps, as shown by "54" of FIG. 6C, and the partial image 1 and the partial image 2 are connected to each other so as to hold the fine image variation information in a direction parallel with the boundary direction.

This method will be described in more detail below.

First, a process of obtaining the substantial step value d of the boundary by using the above-mentioned expression (3) is again executed with respect to the respective boundaries that have been subjected to the correcting process once. As a result, the step series indicated by $d0(0$ to $L-1)$, $d1(0$ to $(L-1))$, $d2(-1$ to $-(L-1))$ and $d3(-1$ to $-(L-1))$ are obtained again.

This step series indicated by $d0(0$ to $L-1)$, $d1(0$ to $(L-1))$, $d2(-1$ to $-(L-1))$ and $d3(-1$ to $-(L-1))$ should be "0" on the average, but the steps partially remains, and an image noise is added thereto.

Therefore, the moving averages of the step series $d0(0$ to $L-1)$, $d1(0$ to $(L-1))$, $d2(-1$ to $-(L-1))$ and $d3(-1$ to $-(L-1))$ are calculated, and its results are set as $dm0(0$ to $L-1)$, $dm1(0$ to $(L-1))$, $dm2(-1$ to $-(L-1))$ and $dm3(-1$ to $-(L-1))$.

Note that the same results are obtained even if the difference operation is conducted after the moving averages are calculated. That is, the process does not depend on the calculation order.

In the boundary a shown in FIG. 4A, $A0(x,y)$ indicated by the following expression (10) is added to data of the partial image A:

$$A0(x,y)=dm0(y)(-x/W+1)/2 \quad (10)$$

where x is 0 to W

Also, $D0(x,y)$ represented by the following expression (11) is added to the partial image D:

$$D0(x,y)=dm0(y)(x/W+1)/2 \quad (11)$$

where x is −1 to W

Also, similarly, in the boundary b shown in FIG. 4A, $A1(x,y)$ indicated by the following expression (12) is added to data of the partial image A:

$$A1(x,y)=dm1(x)(-y/W+1)/2 \quad (12)$$

where y is 0 to W

Also, $B1(x,y)$ represented by the following expression (13) is added to the partial image B:

$$B1(x,y)=dm1(x)(x/W+1)/2 \quad (13)$$

where y is −1 to W

Also, similarly, in the boundary c shown in FIG. 4A, $B2(x,y)$ indicated by the following expression (14) is added to data of the partial image B:

$$B2(x,y)=dm2(y)(-x/W+1)/2 \quad (14)$$

where x is 0 to W

Also, $C2(x,y)$ indicated by the following expression (15) is added to the partial image C:

$$C2(x,y)=dm2(y)(x/W+1)/2 \quad (15)$$

where x is −1 to W

Also, similarly, in the boundary d shown in FIG. 4A, $C3(x,y)$ indicated by the following expression (16) is added to data of the partial image C:

$$C3(x,y)=dm3(x)(-y/W+1)/2 \quad (16)$$

where x is 0 to W

Also, $B3(x,y)$ indicated by the following expression (17) is added to the partial image B:

$$B3(x,y)=dm3(x)(y/W+1)/2 \quad (17)$$

where x is −1 to W

As described above, the respective functions of $A0(x,y)$, $A1(x,y)$, $B1(x,y)$, $B2(x,y)$, $C2(x,y)$, $C3(x,y)$ and $D3(x,y)$ are added respectively to the partial images A, B, C and D to correct local steps to linear shapes, thereby being capable of eliminating the steps on the boundaries.

Note that the substantial step hardly damages the image per se because the inclinations of data of the partial images A, B, C and D are taken into consideration, but if the substantial step is an extremely large value, a device may be made so as not to correct the difference.

Further, the above-mentioned correction of the local steps may be conducted each time when a new partial image is structured by the above-mentioned coupling of the partial images.

The characteristic functions implemented by the x-ray sensing apparatus 100 according to this embodiment are described above. Hereinafter, the structure and operation of the x-ray sensing apparatus 100 will be described in more detail below.

The entire structure of the x-ray sensing apparatus 100:

As shown in FIG. 1, the x-ray sensing apparatus 100 includes partial panels 101a to 101d, amplifiers 102a to 102d, A/D converters 103a to 103d, DMA controllers 104a to 104d, a CPU 109, memories 105 to 108, 110 and 116, a memory unit 111 and an exposure control unit 112.

A CPU 109, the memories 105 to 108, 110 and 116, the high-capacity memory unit 111, and the exposure control unit 112 are so connected as to communicate with each other through a bus 115.

The sequential operation of the x-ray sensing apparatus 100:

The CPU (central processing unit) 109 controls the operation of the entire x-ray sensing apparatus 100.

Figure 7:
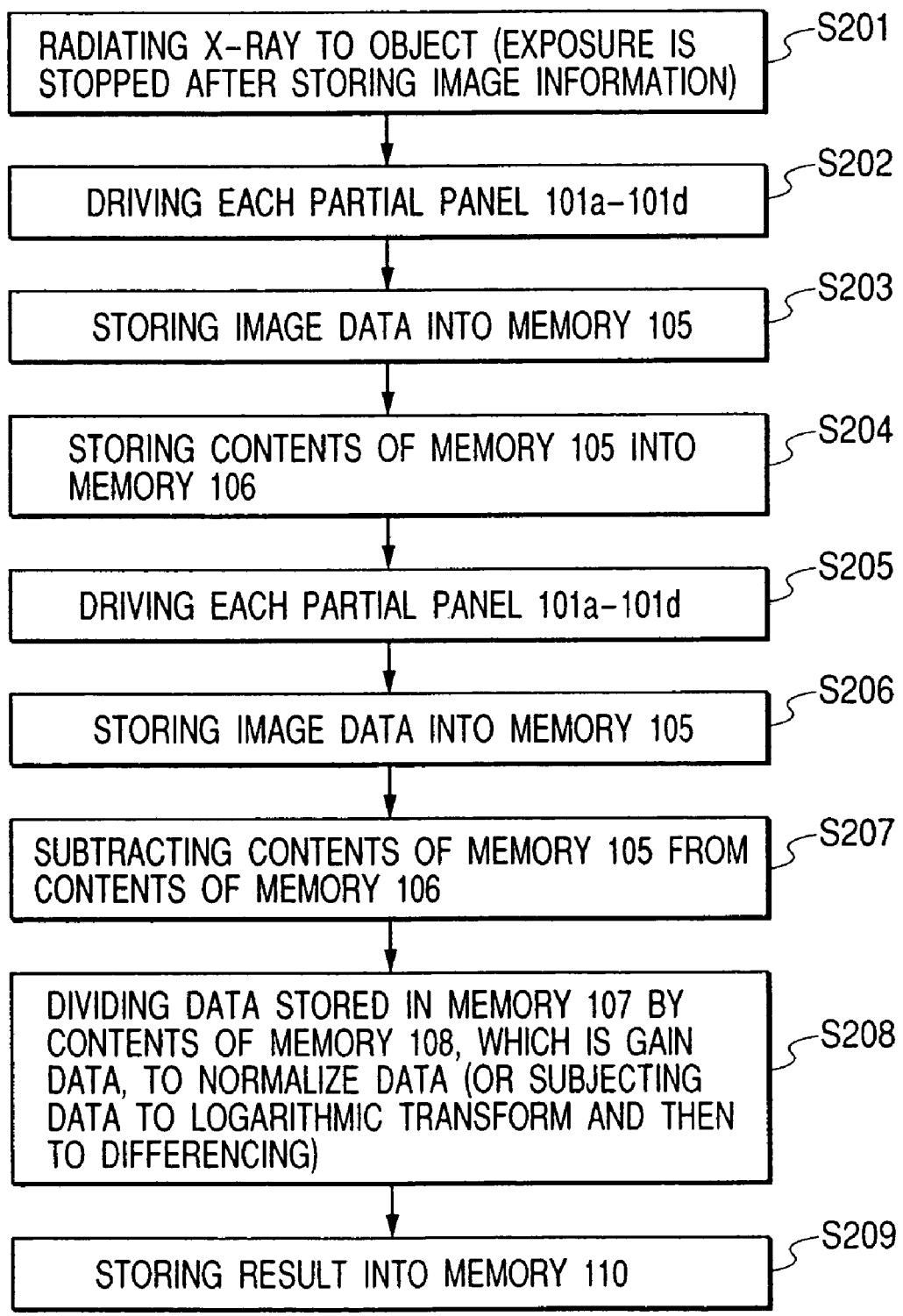
FIG. 7 is a flowchart for explaining the entire operation of the x-ray sensing apparatus.

For example, the memory 116 (program memory) stores processing program according to a flowchart of FIG. 7 therein in advance. The CPU 109 reads and executes the processing program from the program memory 116 to control the operation of the entire x-ray sensing apparatus 100. As a result, the operation of the x-ray sensing apparatus 100 is executed as described below.

Step S201:

Upon radiation of x-rays onto an object 114 (a human body in this example), the exposure control unit 112 first controls an x-ray vessel so that the x-rays radiated from the x-ray vessel 113 pass through the object (human body) 114 and are inputted to each of the partial panels 101a to 101d.

Step S202:

The partial panels 101a to 101d are panels divided from a sheet of sensor panel into four segments, and are driven on the basis of a timing at which the x-ray vessel 113 generates the x-rays independently (sequential driving of switching transistors not shown).

As a result, electric signals corresponding to pixels are outputted from the respective partial panels 101a to 101d.

The respective amplifiers 102a to 102d receive the electric signals outputted from the corresponding partial panels 101a to 101d, amplify and output the electric signals.

The respective A/D converters 103a to 103d receive the electric signals outputted from the corresponding amplifiers 102a to 102d, digitalize and output the electric signals.

Step S203:

The respective DMA controllers 104a to 104d store the data (partial image data) outputted from the corresponding A/D converters 103a to 103d in the memory 105 (dual port memory).

The dual port memory 105 is so structured as to read corresponding partial image data with a string of addresses through the bus 115.

Step S204:

The partial image data stored in the dual port memory 105 is stored in the memory 106 (frame memory) by the CPU 109 or a DMA controller (not shown) on the bus 115.

Steps S205 and S206:

Then, the same operation as the above is conducted in a state where no x-rays are irradiated by the x-ray vessel 113. The partial image data thus obtained is stored in the memory 107 through the dual port memory 105 as the data of an offset-like fixed-pattern.

Steps S207 and S208:

In this situation, information on the gain variation is stored in the memory 108 in advance.

More specifically, x-rays are exposed toward the respective partial panels 101a to 101d by the x-ray vessel 113 in a state where no object 114 exists, and the partial image data resultantly obtained is stored in the memory 108 as the information on the gain variation for each of the pixels in the partial panels 101a to 101d.

Thus, the CPU 109 subtracts the fixed pattern data stored in the memory 107 from the partial image data stored in the frame memory 106, and a correcting process for each pixel of the entire image using the gain variation information stored in the memory 108 is executed with respect to the subtraction result, and the correction result is stored in the memory 117.

The above-mentioned correcting process includes a dividing process, and the dividing process may be dealt with, for example, as a subtracting process that conducts logarithmic transformation using a look up table (LUT).

Also, the CPU 109 stores in the memory 118 information pertaining to the position of a pixel that cannot be corrected on the basis of the gain variation information (a pixel which is a defective pixel from which no data is obtained, etc.) in the above-mentioned correcting process.

The CPU 109 determines as a value of the defective pixel a pixel value analogized from the data of the peripheral pixels (pixels except for the defective pixels) of the pixels (defective pixels) indicated by the information stored in the memory 118 in the image data stored in the memory 117 which has been corrected. For example, the CPU 109 determines the average value of the peripheral pixels as a value of the defective pixel.

Step S209:

The image data that has been subjected to the above-mentioned process is stored in the memory 110 as the image data of the object 114.

In this case, the image data may be over-written in the memory 117 without using the memory 110. As a result, the memory can be effectively employed.

The image data may be saved in the memory unit 111 (a magnetic memory device, a large-capacity nonvolatile memory device or the like) as a file. Alternatively, the image data may be outputted to an external display device, recording device, memory device or the like by an interface (not shown).

Figure 8:
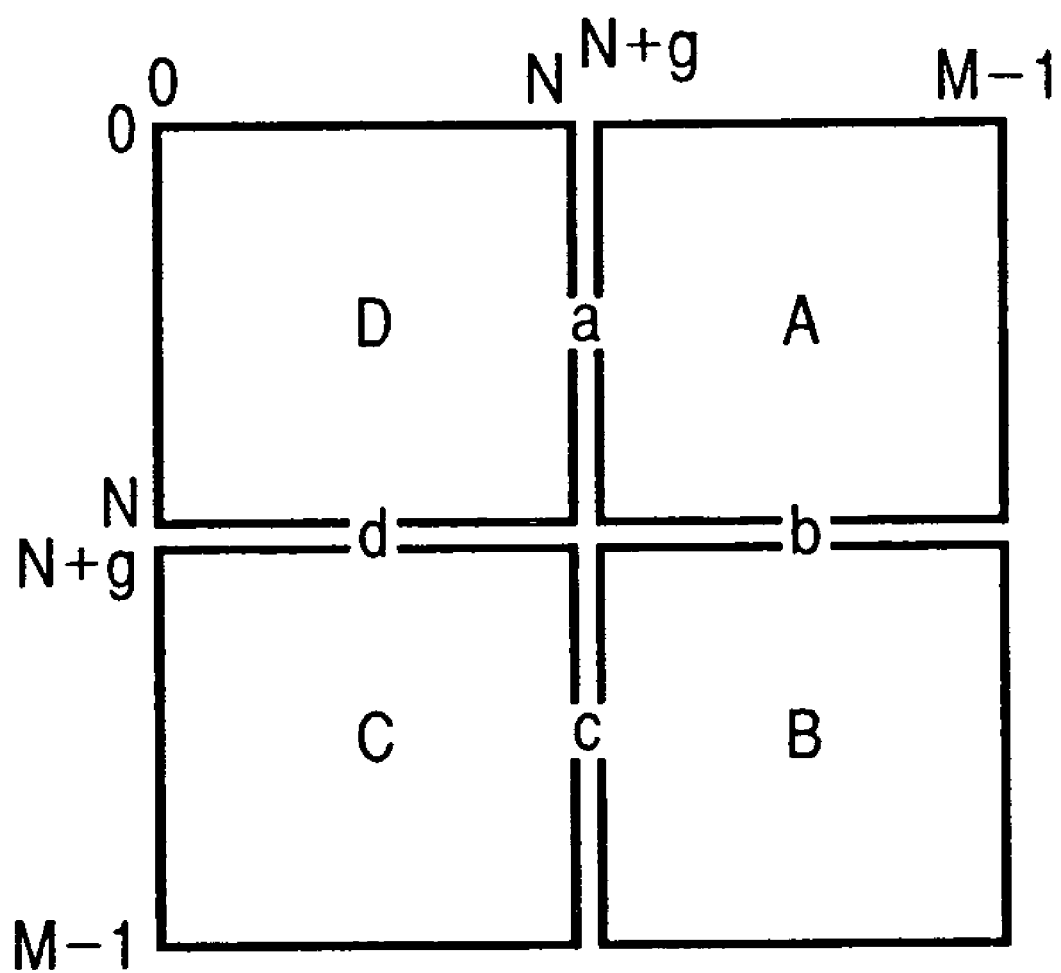
FIG. 8 is a diagram for explaining the segment image acquired by the segment panels of the x-ray sensing apparatus.

In this case, the partial image data obtained independently is normalized by a process using the above-mentioned data stored in the memory 107 (offset-like fixed pattern data), data (gain variation information) stored in the memory 108 or the like, and the user cannot recognize that the data is related to the partial image. The characteristic operation of the x-ray sensing apparatus 100:

FIG. 8 shows a state of the image data of the object 114 stored in the memory 110 through the above-mentioned operation.

As shown in FIG. 8, the data of the respective partial images A, B, C and D corresponding to the partial panels 101a to 101d is stored in the memory 110. Also, a gap of g pixels (hereinafter referred to as "gap g") is defined between the images of the partial images A, B, C and D. The gap is a defective pixel in a sense, but in the case where the offset-like steps are produced between the respective partial images A, B, C and D, the average pixel correction is nonsense. In this embodiment, after the correction for each of the partial images, which will be described later, is conducted, the pixel is corrected with the average value.

More specifically, it is assumed that gap g is equal to 1, for example. The substantial step value d is obtained in accordance with the above-mentioned expression (3).

In the expression (3), assuming that m is equal to 3, the coefficient of the pixel value x(n−2) to x(n+4) is obtained in accordance with a table shown in FIG. 9. In the table, a coefficient for obtaining the differentiation K at a value q and a coefficient for calculating the step value d are separated from each other, and finally summed.

Therefore, the substantial step value d is obtained by the following expression (18).

$$d(i) = \sum_{j=-2}^{4} c(j) \times (n+j) \tag{18}$$

$$= \frac{1}{6}(x(n+4) - x(n-2)) +$$

$$\frac{2}{3}(x(n+3) - x(n-1)) + \frac{11}{6}(x(n) - x(n-2))$$

The substantial step value sequence d(i) are obtained with taking into consideration the inclination of the image data if the substantial step value d is converted into the one-dimensional data sequence that interpose the boundary x(n+1) of the partial image.

The "i" in the above-mentioned expression (18) is an index in a direction parallel with the boundary of the partial image.

Figure 10:
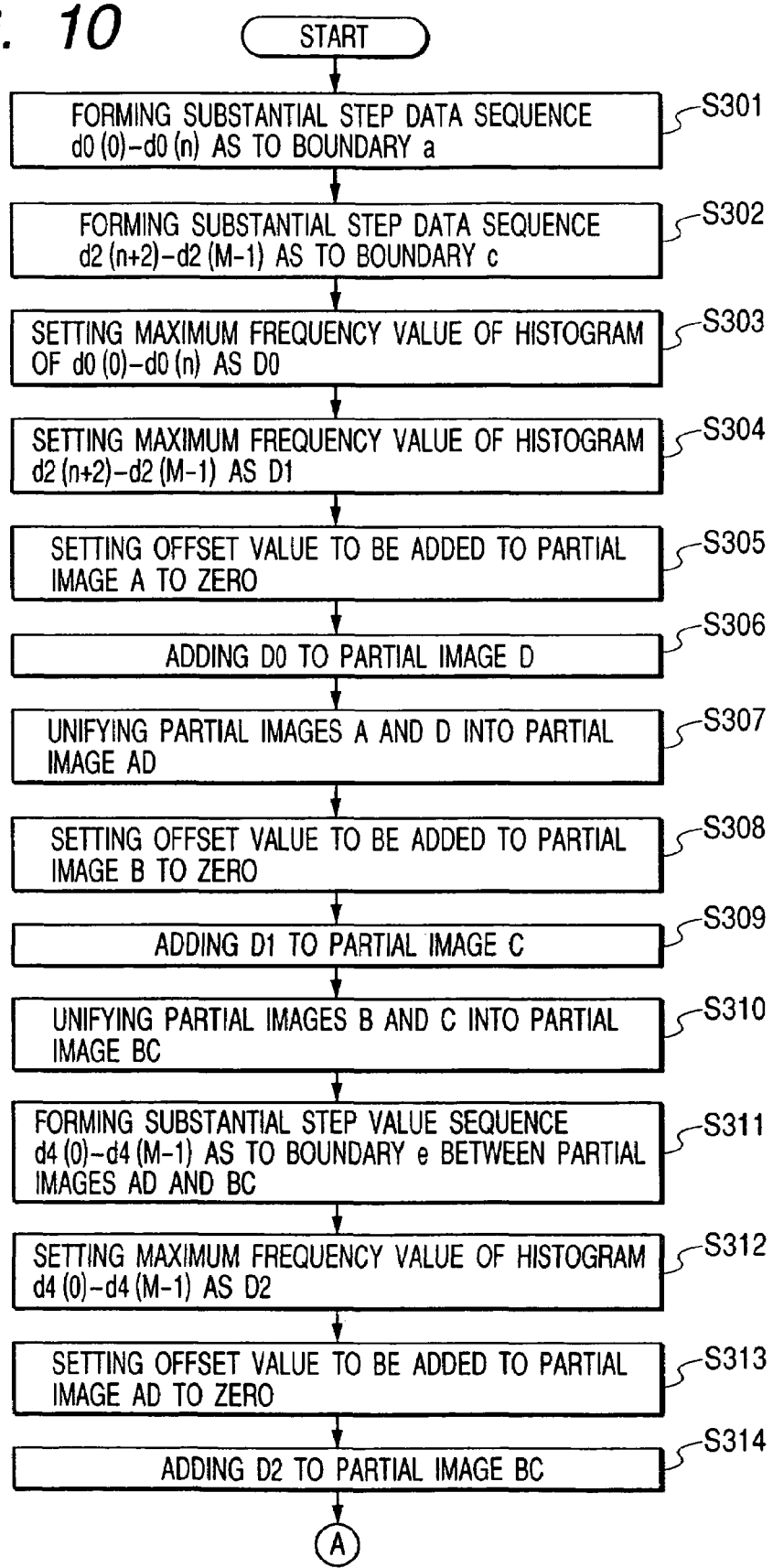
FIG. 10 is a flowchart for explaining a process of acquiring the offset difference between the segment images in the x-ray sensing apparatus.
Figure 11:
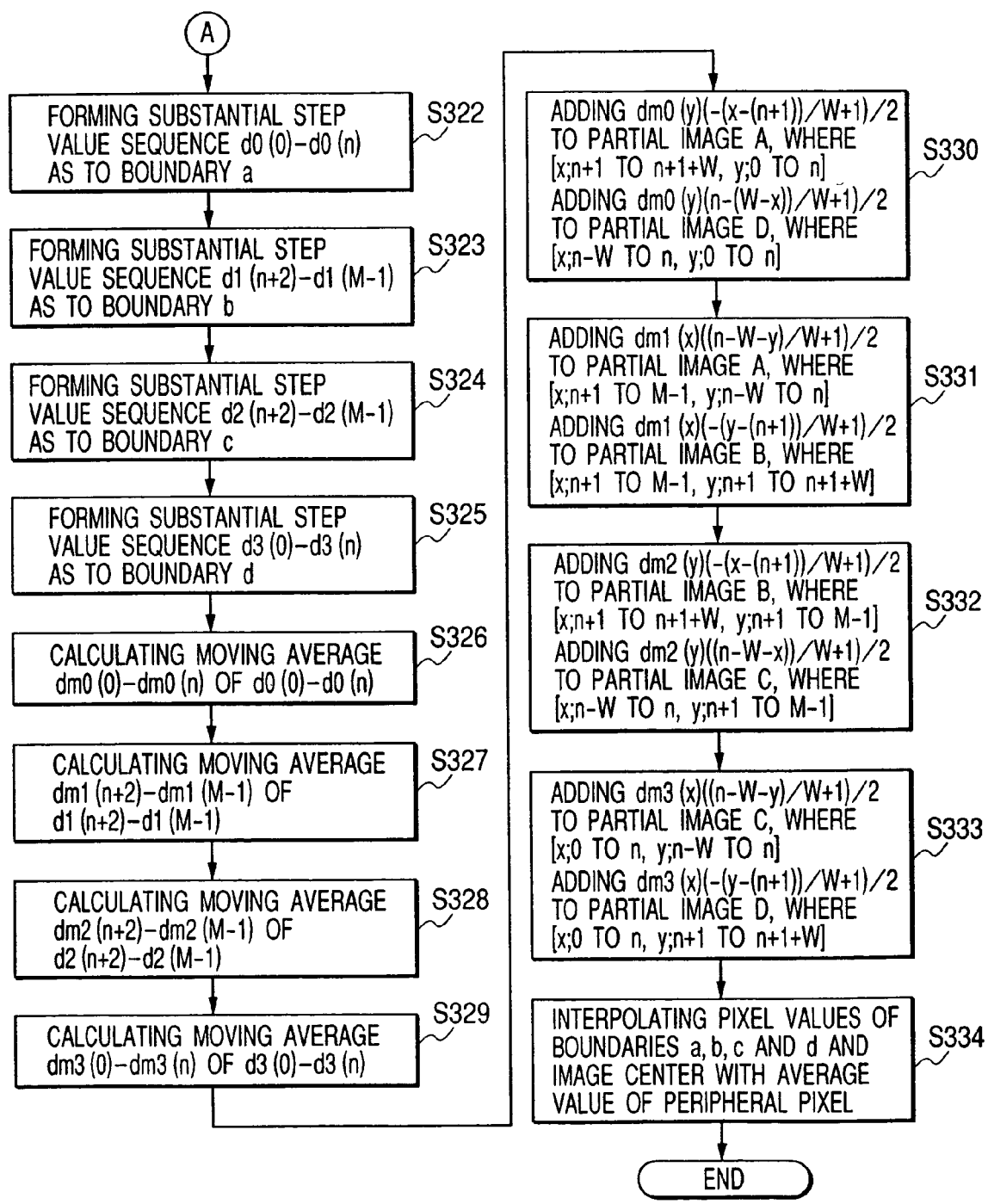
FIG. 11 is a flowchart for explaining a process of repairing the boundary portion of the segment images in the x-ray sensing apparatus.

FIGS. 10 and 11 show a correcting process using the above-mentioned step value sequence d(i). The correcting process is implemented by executing the processing program in accordance with flowcharts shown in FIGS. 10 and 11 which are stored in a program memory 116 in advance.

Steps S301 and S302: See FIG. 10

Step value sequence d0(0) to d0(n) of the boundary a are obtained, and the step value sequence d2(n+2) to d2(M−1) of the boundary c are obtained, through the above-mentioned expression (18).

Figure 12:
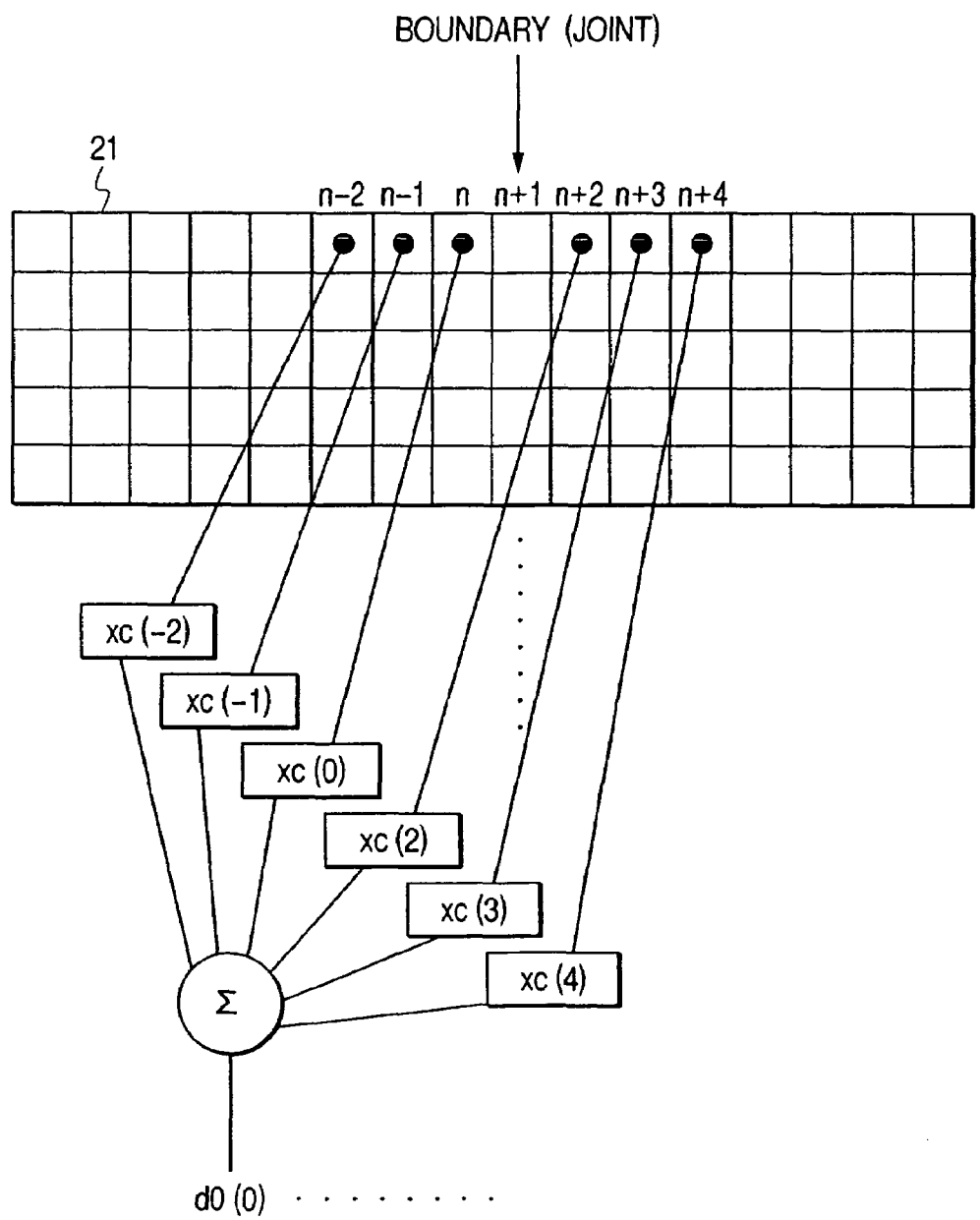
FIG. 12 is a diagram for specifically explaining how to acquire the substantial step value.

More specifically, for example, as shown in FIG. 12, the pixel values are extracted across the boundary in accordance with the addresses of pixels indicated by "21" and then subjected to calculation process of the above-mentioned expression (12), to thereby obtain the difference value sequence d0(i). The above calculation process is executed with respect to all of the boundaries.

Steps S303 and S304:

The step value sequence d0(0) to d0(n) obtained in Steps S301 and S302 and the respective maximum frequency values D0, D1 of the step value sequence d2(n+2) to d2(M−1) are obtained.

As D0 and D1, values that represent the distribution of the average values, the center values or the like may be used.

Step S305 to Step S307:

The offset value that is added to the partial image A is set to "0", and the maximum frequency value Do obtained in Step S303 is added to the partial image D that is opposite to the partial image A. In this case, the maximum frequency value D0 means the step value of the partial image D when viewed from the partial image A.

As a result, the substantial step between the partial image A and the partial image D is eliminated and can be regarded as a new partial image AD.

Step S308 to Step S310:

The offset value that is added to the partial image B is set to "0", and the maximum frequency value D1 obtained in Step S304 is added to the partial image C that is opposite to the partial image B. In this case, the maximum frequency value D1 means the step value of the partial image C when viewed from the partial image B.

As a result, the substantial step between the partial image B and the partial image C is eliminated and can be regarded as a new partial image BC.

Therefore, two new partial images AD and BC shown in FIG. 4B are obtained. Then, those two partial images AD and BC are unified in the following manner.

Steps S311 and S312

The substantial step sequence d4(0) to d4(M−1) of the boundary e of the partial image AD and the partial image BC are prepared. Then, the maximum frequency value D2 is obtained.

Steps S313 and S314:

The offset value that is added to the partial image AD is set to "0", and the step value D2 obtained in Step S312 is added to the partial image BC to unify the partial image AD and the partial image BC. Then, this result is stored in the memory 110.

The image thus stored in the memory 110 results from conducting only the offset-like correction over the entire partial images A to D. However, in fact, the variations of the partial images A to D are not limited to the uniform offset, and there are many cases in which the above correction is insufficient.

Under the above circumstances, a process is executed in which only the vicinity of the boundaries of the image stored in the memory 110 is corrected so that a sense of incongruity that the entire image is the collection of a plurality of partial images is not given to an observer through process starting from Step S322 which will be described below. As one example, the correction is conducted by a method shown in FIG. 6C.

Step S322 to Step S325: See. FIG. 11

The substantial step value sequence d0(0) to d0(n), a1(n+2) to d1(M−1), d2(n+2) to d2(M−1), d3(0) to d3(n) of the original boundaries a, b, c and d are obtained in the same manner as Step S301 in FIG. 10.

Step S326 to Step S329:

The step value sequence d0(0) to d0(n), a1(n+2) to d1(M−1), d2(n+2 to d2(M−1), d3(0) to d3(n) obtained in Steps S322 to S325 are converted into smooth numeric sequence due to the moving average or the like. This is because the step value sequence d0(0) to d0(n), a1(n+2) to d1(M−1), d2(n+2 to d2(M−1), d3(0) to d3(n) are influenced by various noises.

Step S330 to Step S333:

The local correcting process of the step components shown in the above-mentioned expressions (10) to (17) is executed.

That is, as to the original boundary a, the changed origin of the above-mentioned expressions (10) and (11) is used, and $dm0(y)(-x/W+1)/2$, wherein x: n+1 to n+1+W, y: 0 to n, is added to the partial image A, and $dm0(y)(x/W+1)/2$, wherein x: n−W to n, y: 0 to n, is added to the partial image D.

Similarly, as to the original boundary b, the changed origin of the above-mentioned expressions (12) and (13) is used, and $dm1(x)(-y/W+1)/2$, wherein x: n+1 to M−1, y: n−W to n, is added to the partial image A, and $B1(x,y)=dm1(x)(y/W+1)/2$, wherein x: n+1 to M−1, y: n+1 to n+1+W, is added to the partial image B.

Similarly, as to the original boundary c, the changed origin of the above-mentioned expressions (14) and (15) is used, and $B2(x,y)=dm2(y)(-x/W+1)/2$, wherein x: n+1 to n+1+w, y: n+W to M−1, is added to the partial image B, and $C2(x,y)=dm2(y)(x/W+1)/2$, wherein x: n−W to n, y: n+1 to M−1, is added to the partial image C.

Similarly, as to the original boundary d, the changed origin of the above-mentioned expressions (16) and (17) is used, and $C3(x,y)=dm3(x)(-y/W+1)/2$, wherein x: 0 to n, y: n−W to n, is added to the partial image C, and $B3(x,y)=dm3(x)(y/W+1)/2$, wherein x: 0 to n, y: n+1 to n+1+W, is added to the partial image B.

Step S334:

After the local steps are corrected to linear shapes with respect to the partial images A, B, C and D so as to eliminate the steps on the boundaries through Steps S330 to S333, the pixels of the boundary portion that finally remains are interpolated with pixels that are not the defective pixels in the vicinity of the boundary portion. The region of the interpolated pixels includes a region where only one pixel does not exist in the boundary portion, that is, a region that cannot be subjected to interpolation unless correction is conducted for each of the partial images up to now.

In this embodiment, the above-mentioned operation is realized by programming in a calculator system, but the present invention is not limited to this structure. For example, the above-mentioned operation may be realized by hardware, or may be realized by a structure that mixes hardware and program environments.

Also, the above-mentioned repair of the vicinity of the boundary may be executed for each of the processes shown in FIG. 10.

Subsequently, a second embodiment of the present invention will be described below.

In this embodiment, in the case where the offset components of the partial image is not uniform within the partial image, the step value sequence is not represented by a fixed value (the maximum frequency value, the average value or the like), but the step value sequence between two partial images is fitted by a function of the low degree of freedom to prepare a step function, and the step function is divided into two and added to both of the partial images, to thereby unify two partial images.

Note that, in this embodiment, the step function is prepared, and the step function is divided into two and added to both of the partial images. However, for example, it is possible that the step function is added to one partial image, and a function resulting from reversing the sign of the step function is added to the other partial function.

Figure 13A:
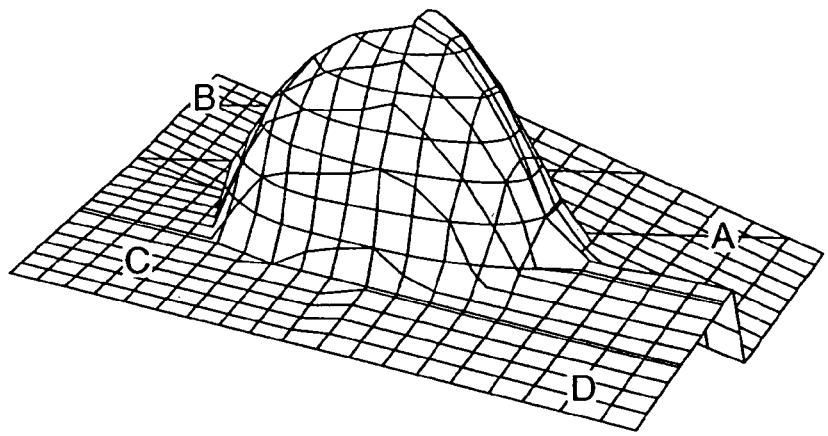
FIGS. 13A, 13B and 13C are diagrams for schematically explaining an example of the method of repairing the boundary portion of the segment images in a second embodiment.
Figure 13B:
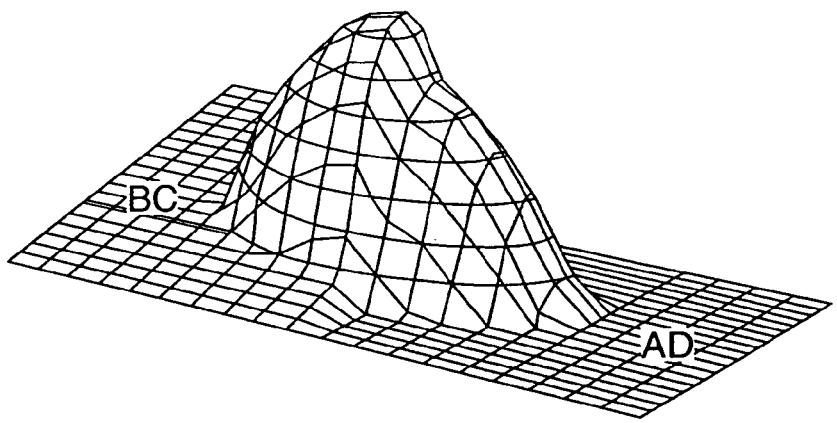
Figure 13C:
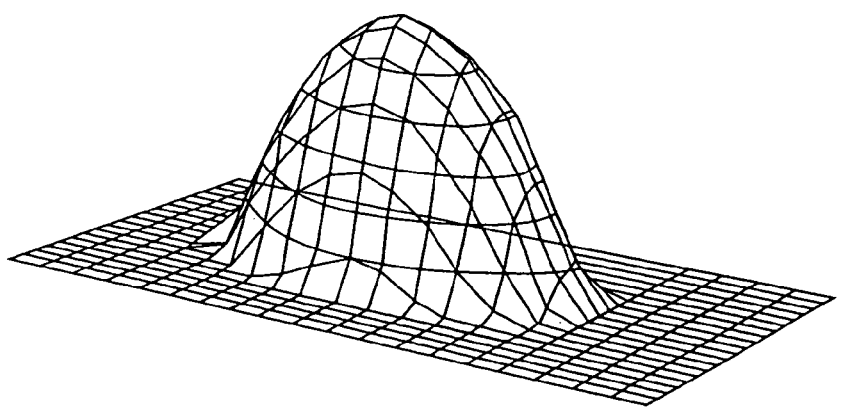

FIGS. 13A to 13C schematically show this embodiment.

First, as shown in FIG. 13A, an non-uniform inclined offset is superimposed on four partial images A, B, C and D.

Then, as shown in FIG. 13B, the substantial step value sequence in the boundary region between the partial image A and the partial image B is obtained. A function resulting from fitting the step value sequence is divided into two, and the two step value sequences whose signs are reversed to each other are added to both of the partial image A and the partial image D so as to eliminate the step value sequence. The same process is conducted on the partial image B and the partial image C.

Then, as shown in FIG. 13C, the same process as the above is conducted on the boundary region of the new partial image AD and the partial image BC which are obtained in the process shown in FIG. 13B, to thereby generate one image without any boundary between the partial image AD and the partial image BC.

Figure 14:
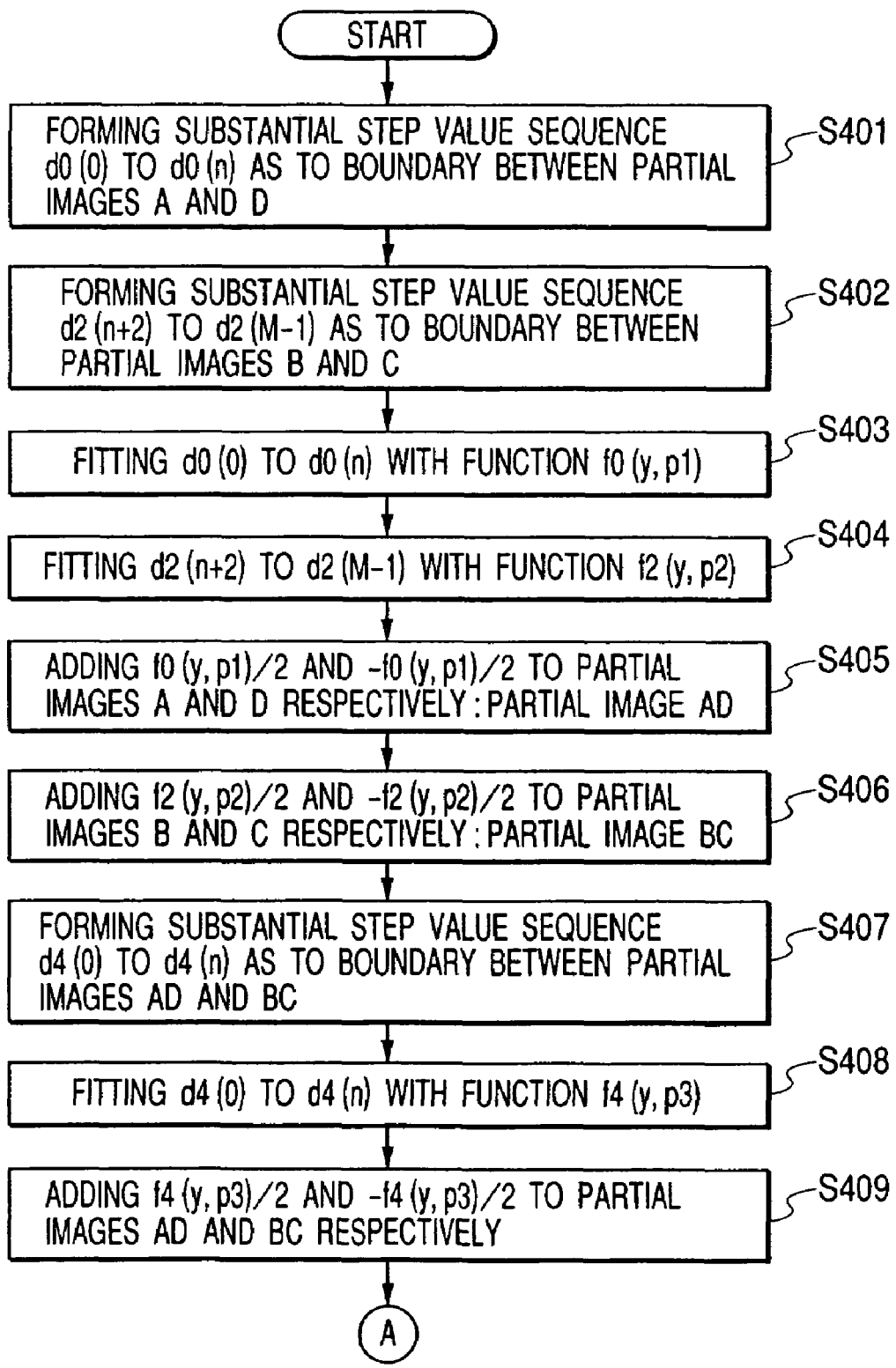
FIG. 14 is a flowchart for explaining the above-mentioned repairing method.

FIG. 14 shows a process of this embodiment. This process is implemented by executing the processing program, for example, by a CPU 109 in accordance with a flowchart shown in FIG. 14 which is stored in the program memory 116 in advance.

Step S401:

The step value sequence d0(0) to d0(n) of the boundary between the partial image A and the partial image D is obtained through the above-mentioned expression (18).

Step S402:

The step value sequence d2(n+2) to d2(M−1) of the boundary between the partial image B and the partial image C is obtained through the above-mentioned expression (18).

Step S403

The step value sequence d0(0) to d0(n) obtained in Step S401 is fitted by a function f0(y,p1). The function f0(y,p1) is a function having a parameter p1 assuming that y is the longitudinal axis of the image.

Step S404:

The step value sequence d2(n+2) to d2(M−1) obtained in Step S402 is fitted by a function f2(y,p2)). The function f2(y,p2)) is a function having a parameter p2 assuming that y is the longitudinal axis of the image.

Step S405:

In order to set the step function f0(y,p1) to substantially "0", f0(y,p1)/2 is added to the partial image A, and −f0(y,p1)/2 is added to the partial image D.

Step S406:

In order to set the step function f2(y,p2)) to substantially "0", f2(y,p2))/2 is added to the partial image B, and −f2(y,p2))/2 is added to the partial image C.

Therefore, the partial image A and the partial image D are unified into a new partial image AD, and similarly the partial image B and the partial image C are unified into a new partial image BC.

Step S407:

The step value sequence d4(0) to d4(n) of the boundary between the new partial image AD and the new partial image BC is obtained through the above-mentioned expression (18).

Step S408

The step value sequence d4(0) to d4(n) obtained in Step S407 is fitted by a function f4(y,p3). The function f4(y,p3) is a function having a parameter p3 assuming that y is the longitudinal axis of the image.

Step S409:

In order to set the step function f4(y,p3) to substantially "0", f4(y,p3)/2 is added to the partial image AD, and −f4(y,p3)/2 is added to the partial image BC.

The above-mentioned process enables an appropriate correction of the step between the respective partial images A, B, C and D even if those four partial images A, B, C and D are images on which not uniform but the varied components are superimposed.

Thereafter, the process shown in FIG. 11 is executed to add the repair at the step position. The repair in the vicinity of the boundary in this situation may be conducted every time the process shown in FIG. 14 is executed.

Subsequently, a third embodiment of the present invention will be described below.

Figure 15A:
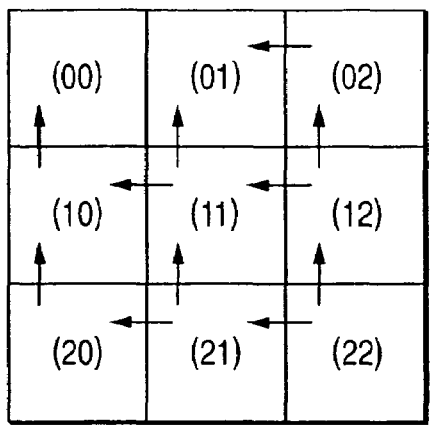
FIGS. 15A, 15B, 15C, 15D and 15E are diagrams for schematically explaining a process of sequentially unifying a plurality of segment images in a third embodiment.
Figure 15B:
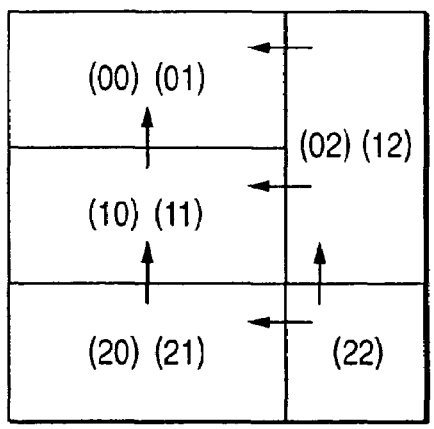
Figure 15C:
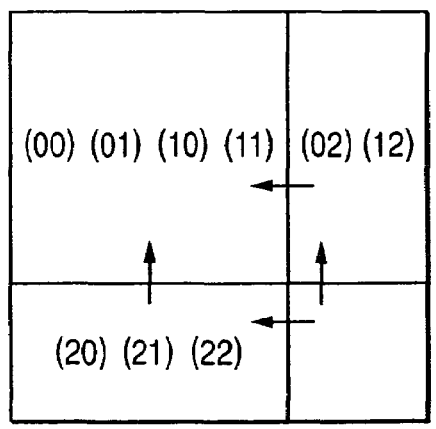

In this embodiment, for example, in the x-ray sensing apparatus 100 shown in FIG. 1, the four partial panels 101a to 101d are replaced with nine partial panels to acquire nine partial images (00) to (22) as shown in FIG. 15A, and two partial images which are independent from each other are sequentially selected from those partial images (00) to (22) and combined together.

Figure 15D:
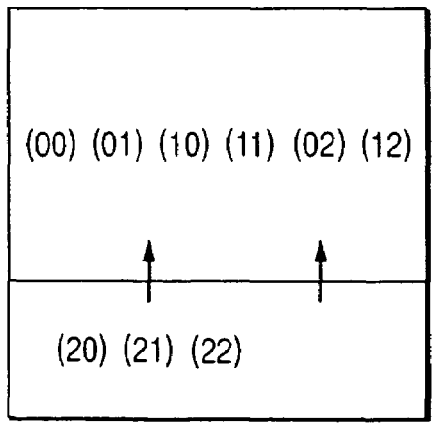
Figure 15E:
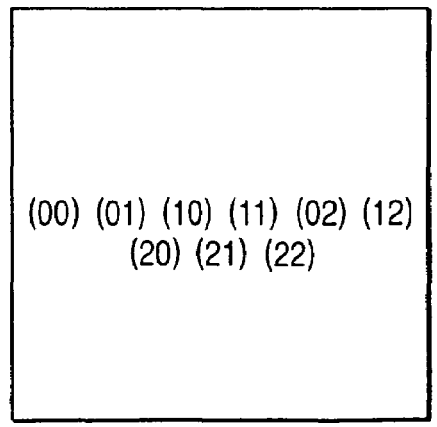

More specifically, the nine partial images (00) to (22) that are in a state shown in FIG. 15A are unified as indicated in the order of FIGS. 15B, 15C, 15D and 15E. In this situation, as shown in FIG. 15D, it should be noted that when two partial images are formed, the boundary of both the partial images is linear.

After the unified state shown in FIG. 15D, the process shown in FIG. 11 is executed to add the repair at the step position. The repair in the vicinity of the boundary in this situation may be conducted every time the process shown in FIG. 14 is executed.

Subsequently, a fourth embodiment of the present invention will be described below.

Figure 16:
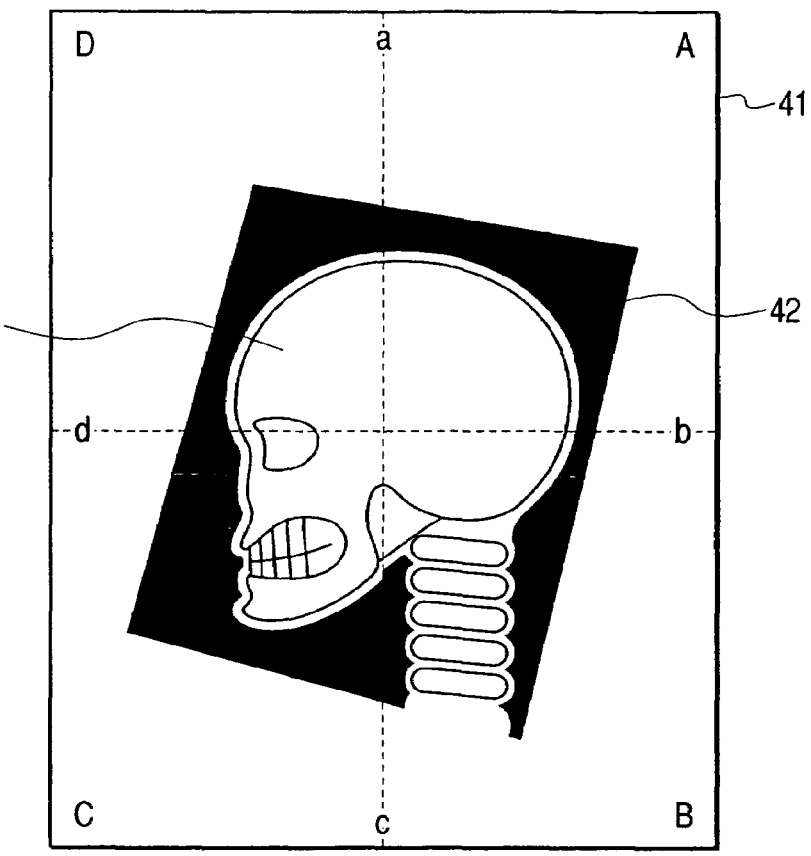
FIG. 16 is a diagram for explaining four segment images in a fourth embodiment.

In this embodiment, it is assumed that an image of the object 114 obtained by the x-ray sensing apparatus 100 shown in FIG. 1, that is, an image stored in the memory 110 is, for example, an image shown in FIG. 16.

In FIG. 16, "41" denotes a portion onto which no x-rays are radiated, "42" denotes a portion onto which the x-rays radiated from the x-ray vessel 113 is focused through a collimator, and "43" denotes a portion onto which the object 114 is projected.

That is, a pixel onto which the x-rays are hardly radiated or not radiated at all exists in the portion 41. On the contrary, a pixel onto which very intensive x-rays that have not passed through the object 114 are radiated exists in the portion 42 (a portion where there exists no object 114). Then, a pixel onto which intermediate intensive x-rays are radiated exists in the portion 43 (a portion of the object 114).

In this example, the output (electric signal) of the x-ray sensor panel is generally in proportion to the incident x-ray intensity, and in the energy transformation or the transforming process of the electric signal (the amplification, the impedance transformation or the like), the x-ray intensity and the linearity of the output electric signal are not always constant in the sensitive region of the sensor panel.

In particular, in the portion where the x-ray intensity is very high, the non-linearity gradually appears as approaching to the output saturation region of the electric system. Also, in the portion where the x-ray radiation is weak, the non-linearity appears due to the influence of noises, the non-stability of action at a super-low voltage of the electric circuit or the like.

The image information on the portion where the above-mentioned non-linearity appears is nonsense information in almost all cases, and there arises no problem even if such image information normally exists.

However, in the case where the offset component of the entire partial image (for example, an offset in case of the image data that is in proportion to the x-rays, and a gain in case of the image data that is in proportion to the logarithm) is derived from the statistical action of a part of the partial image, when the above-mentioned portion where an error caused by the non-linearity is large occupies a very large area, the error adversely affects the entire image, thereby failing to extract an accurate offset component.

Under the above circumstances, in this embodiment, a section where the linearity is reliable is determined in the sensitive region of the sensor panels 101a to 101d in advance, and only in the case where a representative value such as the average value in the vicinity is in the reliable section before or at the same time when the substantial step value d is calculated, the step value d is used to provide the step value d in a necessary region.

For example, in the case of medical x-ray sensing, at the time when it is detected that the amount of x-rays that passes through the object 114 and reaches the sensor panels 101a to 101d becomes an appropriate dose value by radiating the x-ray amount onto the object 114 in advance or measuring the x-ray amount that is called "photo timer", the x-rays are blocked. As a result, the x-ray amount is always adjusted to an optimum value, and the linearity at the portion where there exists the object information is always optimum in many cases.

For this reason, in this embodiment, the average value m(i) of the data that interposes the boundary is obtained by the following expression (19).

$$m(i) = \frac{1}{6}\left(\sum_{j=-2}^{0} x(n+j) + \sum_{j=-1}^{4} x(n+j)\right) \quad (19)$$

If the average value m(i) satisfies the following condition assuming that the minimum value is V0 and the maximum value is V1 in the reliable section, the step value d(i) obtained by the above-mentioned expression (18) is used and added to the histogram preparation.

$$V0 \leq m(i) \leq V1$$

In this embodiment, two partial images are unified by using only the above-mentioned step value d(i). That is, in the generation of the histogram in Steps S303, S304 and S312 shown in FIG. 10, only a value obtained from the average value m(i) is used.

Subsequently, a fifth embodiment of the present invention will be described below.

In this embodiment, only the step value is used for the reliable section in the fourth embodiment to conduct the function fitting corresponding to the second embodiment even if the step value at the necessary region is obtained.

That is, only the step value in the reliable section is used for the function fitting. As a result, the fitting of the data sequence of the irregular intervals is made.

In the above-mentioned first to fifth embodiments, in the case where one image is made up of a plurality of partial images that do not overlap each other, an offset between two adjacent partial images selected from the plurality of partial images is corrected (adjusted) to generate one partial image where the boundary is not visible, as one new partial image into which the two partial images are unified. In this situation, those two partial images may be corrected on the basis of the statistic property of the pixel value in the boundary portion region between the unified two partial images. This unifying process is repeatedly executed until all of the plural partial images have been unified into one new image with the result that one final image becomes an image where the boundary is not visible.

With the above structure, because the variations of the individual partial images can be stably corrected, one final image in the excellent state into which the partial images have been unified can be obtained.

A sixth embodiment of the present invention will be described below, in which the description of the same parts as those in the first embodiment will be omitted.

Differences of the sixth embodiment from the first embodiment reside in a correcting method where the correction to the partial images A, B, C and D is conducted by addition/subtraction of a constant value, and the operation related to Steps S301 to S314 in the operation of the x-ray sensing apparatus 100. First, the correcting method according to the sixth embodiment will be described.

In the case of using the constant value, the step values d0(0 to L−1), d1(0 to (L−1)), d2(−1 to −(L−1)) and d3(−1 to −(L−1)) at the boundaries a, b, c and d are consolidated into one certain value. For that reason, the values D0, D1, D2 and D3 are derived from the step values d0(0 to L−1), d1(0 to (L−1)), d2(−1 to −(L−1)) and d3(−1 to −(L−1)) one by one, respectively.

Figure 17:
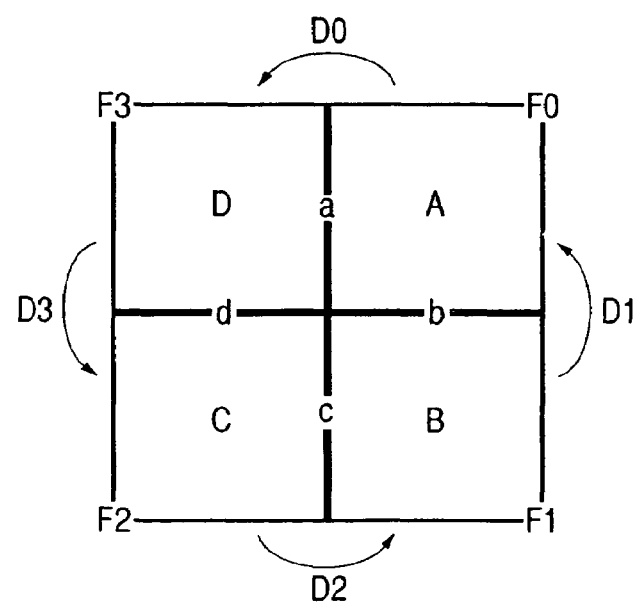
FIG. 17 is a diagram for schematically explaining an example of a method of correcting the segment image.

As a method of deriving the values D0, D1, D2 and D3, there may be applied a method of obtaining the respective average values of the step values d0(0 to L−1), d1(0 to (L−1)), d2(−1 to −(L−1)) and d3(−1 to −(L−1)) as the values D0, D1, D2 and D3. However, for example, if the step values are not averagely corrected, but a region as large as possible is corrected, for example, as shown in FIG. 17, the maximum frequency value (a peak of the histogram) is used as the values D0, D1, D2 and D3.

It is needless to say the following expression is satisfied.

$$D0+D1+D2+D3=0$$

However, the following expression needs to be applied due to an error in calculation, an influence of the image noise, unconstant offset value and so on.

$$D0+D1+D2+D3=\epsilon(\neq 0)$$

The correction values F0, F1, F2 and F3 are added to the data of the respective partial images A, B, C and D to correct the step on the boundary.

For example, it is assumed that F0 is equal to 0 with the partial image A as a reference. In this case, if D0+D1+D2+D3=0 is satisfied, the same effect is obtained even if clockwise or counterclockwise order is applied, and the correction values F0, F1, F2 and F3 are represented by the following expressions:

$$F0=0$$

$$F1=D1=-D0-D3-D2$$

$$F2=D1+D2=-D0-D3$$

$$F3=D1+D2+D3=-D0$$

On the other hand, if the following expression is satisfied, the inconsistency is prevented with the average of the clockwise and counterclockwise.

$$D0+D1+D2+D3=\epsilon(\neq 0)$$

That is, the correction values F0, F1, F2 and F3 in this case are represented by the following expressions:

$$F0=0$$

$$F1=(D1-D0-D3-D2)/2$$

$$F2=(D1+D2-D0-D3)/2$$

$$F3=(D1+D2+D3-D0)/2$$

This corresponds to the uniformly distribution of the error all over.

As a method of preventing the above-mentioned inconsistency, there is applicable a method in which the minimum absolute value among the values D0 to D3 is replaced with the sum of other values, whose sign is reversed.

Also, because there is resultantly no fear that the pixel value of the image becomes negative if all of the correction values F0 to F3 are set to positive values, the minimum value among the correction values F0 to F3 may be added to all the values.

Subsequently, Steps S301 to S321 which are the operation different from Steps S301 to S314 of the operation of the x-ray sensing apparatus 100 according to the first embodiment will be described below.

Figure 18:
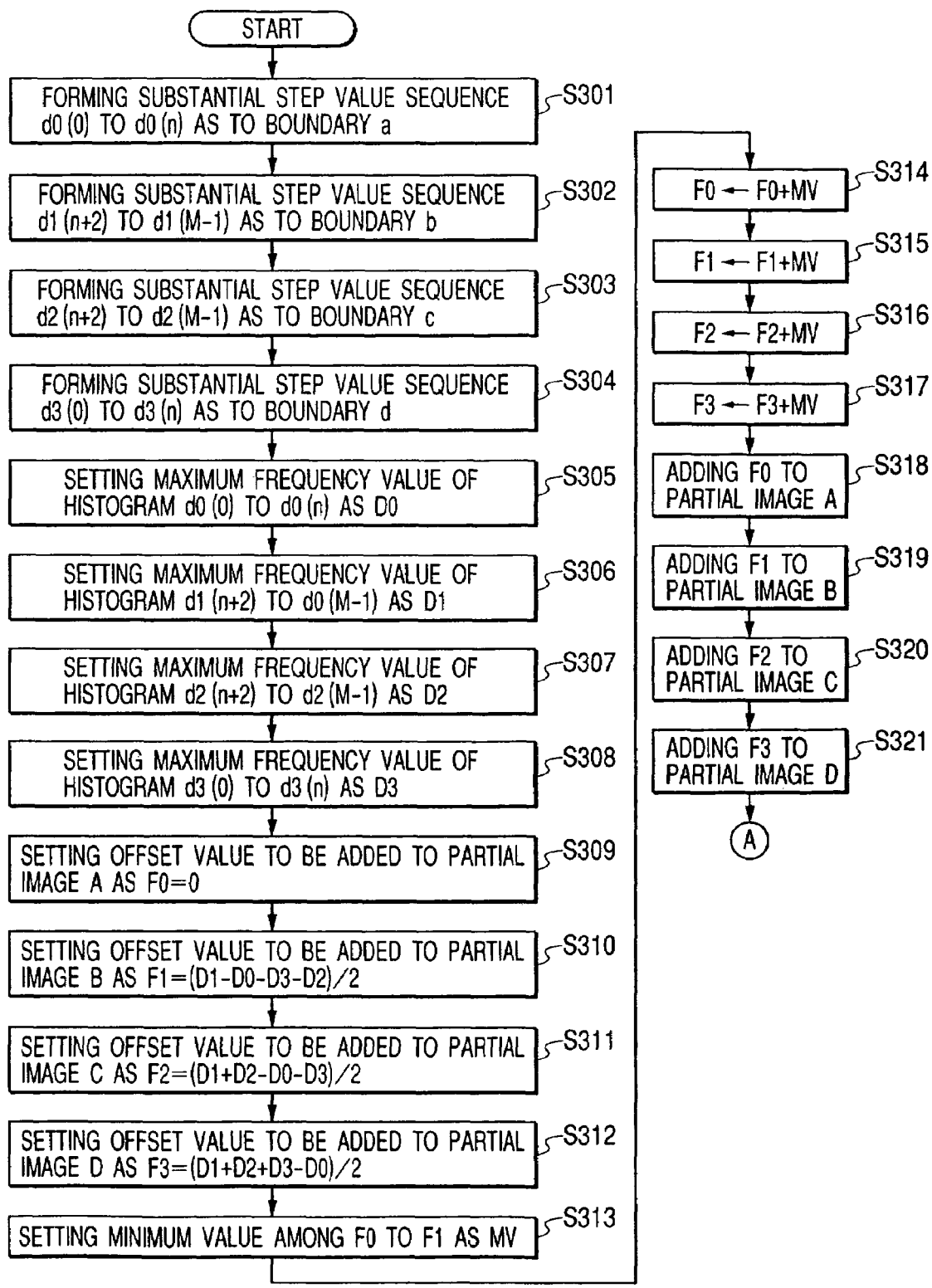
FIG. 18 is a flowchart for explaining a process of acquiring an offset difference between the segment images in the x-ray sensing apparatus.

FIGS. 18 and 10 show a correcting process using the above-mentioned step value sequence d(i). The correcting process is implemented by executing the processing program by the CPU 109 in accordance with the flowcharts shown in FIGS. 18 and 10 which are stored in the program memory 116 in advance.

Step S301 to Step S304: See FIG. 18

Four sequences of d0(0) to d0(n), a1(n+2) to d1(M−1), d2(n+2) to d2(M−1), d3(0) to d3(n) on the boundaries of the partial images A, B, C and D are prepared through the above-mentioned expression (18).

More specifically, for example, as shown in FIG. 12, the pixel value is extracted across the boundaries in accordance with the address of a pixel indicated by "21", and the calculation process of the above-mentioned expression (12) is conducted, to thereby obtain the step value sequence d0(i). This calculation process is executed on all of the boundaries.

Step S305 to Step S308:

The respective maximum frequency values of d0(0) to d0(n), a1(n+2) to d1(M−1), d2(n+2) to d2(M−1), d3(0) to d3(n) obtained in Step S301 to Step S304 are obtained as D0, D1, D2 and D3. As D0, D1, D2 and D3, for example, values that represent the distribution of the average value, the center value or the like may be employed.

Step S309 to Step S312:

It is assumed that the offset value F0 added to the partial image A is "0", and the offset values F1, F2 and F3 added to other partial images B, C and D are (D1−D0−D3−D2)/2.

Step S313 to Step S317:

It is assumed that all of the offset values F0 to F3 in Step S309 to Step S312 are positive values. This is because since the pixel value of the image is basically a positive value, it is ensured that the pixel value is a positive value even after it has been subjected to calculation process.

More specifically, for example, assuming that the minimum value of the offset values F0 to F3 is "MV", "MV" is added to the respective values.

Step S318 to Step S321:

The offset values F0 to F3 obtained in Step S313 to Step S317 are added to the partial images A to D, respectively.

This result is stored in the memory 110. The image thus stored in the memory 110 results from conducting only the offset-like correction over the partial images A to D. However, in fact, the variations of the partial images A to D are not limited to the uniform offset, but there are many cases in which the above-mentioned correction is insufficient.

Under the above circumstances, there is executed a process in which only the vicinity of the boundaries of the image stored in the memory 110 is corrected so that a sense of incongruity that the entire image is the collection of a plurality of partial images is not given to an observer through processing starting from Step S322 which will be described below. As one example, a method shown in FIG. 6C is employed.

Next, a seventh embodiment of the present invention will be described below.

In the sixth embodiment, four partial images obtained by the partial panels 101a to 101d resulting from dividing a single sensor panel into four pieces are processed by independent systems in parallel. On the other hand, in this embodiment, more partial images are processed by independent systems in parallel.

Figure 19A:
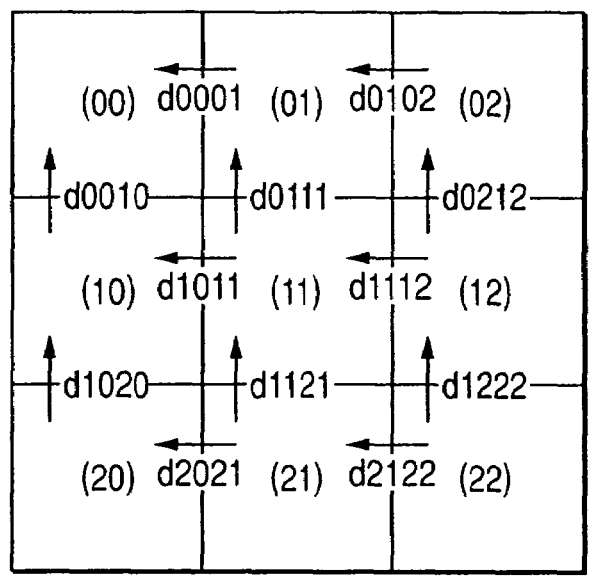
FIGS. 19A and 19B are diagrams for explaining a plurality of segment images in a seventh embodiment.

For example, as shown in FIG. 19A, in the case where a single image is made up of the collection of nine partial images (00), (01), (02), (10), (11), (12), (20), (21) and (22), 12 boundaries exist in partial images (00), (01), (02), (10), (11), (12), (20), (21) and (22).

Figure 19B:
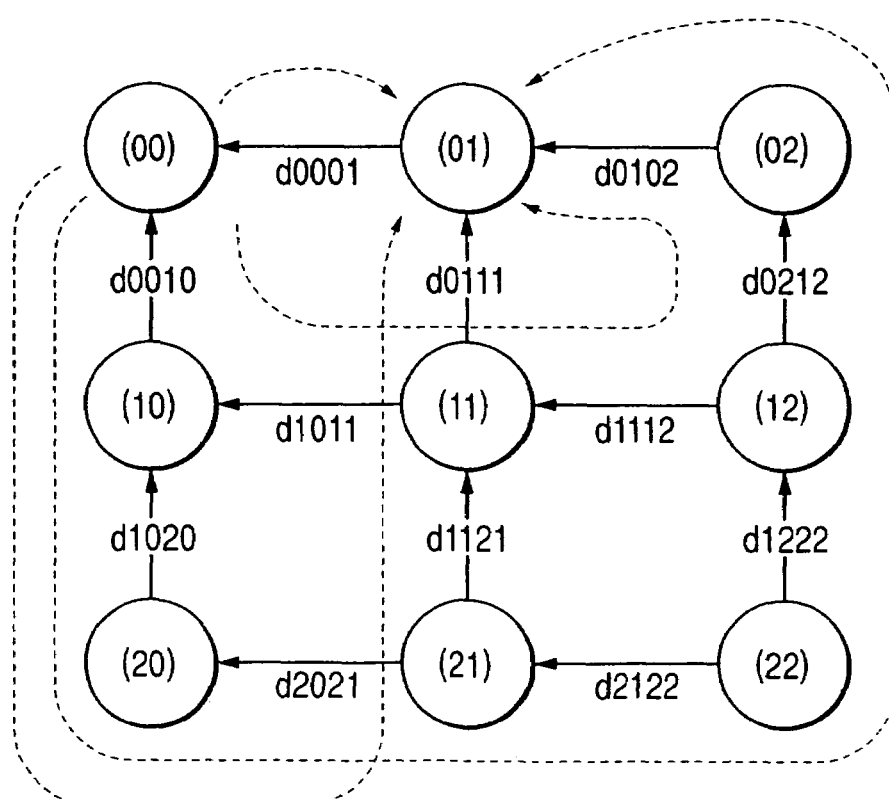

In this case, the substantial step value d is obtained in the same manner as that in the first embodiment in a direction indicated by an arrow in FIG. 19B with respect to the partial images (00), (01), (02), (10), (11), (12), (20), (21) and (22).

The step value d is obtained, independently, and thus all of the step values d are not inconsistent. Accordingly, the correction offset values to be added to the respective partial images need to be obtained from the average value of the sum of the step values at every routes.

More specifically, the joint of the partial images (00), (01), (02), (10), (11), (12), (20), (21) and (22) shown in FIG. 19A leads to a problem on circulation between cells (partial images) as shown in FIG. 19B.

In this example, if an offset value starts from a certain cell and is added with the step value on the connection line, and a value at the time of reaching the original cell is not 0 even if the system passes through any route, this system is inconsistent. In this example, a method of solving this inconsistency is realized.

For example, it is assumed that F00="0" with reference to the offset value that is added to the partial image (00). The offset value F01 of a succeeding partial image (01) is obtained by averaging the offset values that pass through all of paths from the partial image (00) to the partial image (01).

In this case, four routes indicated by a broken line in FIG. 19B are considered to cover all with the least routes. The offset value F01 in this case can be obtained by the following calculation process.

$$F01=(d0001+3 \cdot d0010+2 \cdot d1020+2 \cdot d2021+d2122-d1222-2 \cdot d0212-2 \cdot d0102-d1121-d0111)/4$$

In the above-mentioned method, there is a fear that a step value which is used several times exists depending on the path through which the offset value pass, and thus the average value may be leaned. It is difficult to obtain the path even if it is deductively considered. In obtaining the optimum route (a route that passes through all of paths as uniformly as possible), it is preferable to use a specific manner such as dynamic programming.

Upon the completion of retrieval of all the routes from the partial image (00) to all of other partial images (01), (02), (10), (11), (12), (20), (21) and (22), information on the retrieval result is stored. Then, after the step value is calculated, the correction offset values F01, F02, F10, F11, F12, F20, F21 and F22 that are added to the respective partial images (00), (01), (02), (10), (11), (12), (20), (21) and (22) are obtained without any inconsistency. Finally, the minimum value may be added so that all of the correction offset values become positive.

Thereafter, in all of the boundaries, the same step correcting process as that in the sixth embodiment is executed.

As described above, according to the sixth and seventh embodiments, in the case where one image is made up of the collection of plural partial images, since the difference between the partial images is corrected on the basis of the statistic property of the pixel value in the vicinity of the boundary between the partial images, the substantial step value on the boundary portion can be statistically processed, thereby being capable of stably correcting the variations of the respective partial images. Therefore, one image excellent in image quality can be provided.

It is needless to say that the object of the present invention is achieved by supplying a storage medium that stores a program code of software which realizes the functions of a host computer and a terminal in accordance with the first to seventh embodiments therein to a system or a device, and reading and executing the program code stored in the storage medium by a computer (or a CPU or an MPU) in the system or the device.

In this case, the program code per se read from the storage medium realizes the functions of the first to seventh embodiments, and the storage medium that stores the program code therein constitutes the present invention.

As the storage medium for supplying the program code, there can be used a ROM, a floppy disk, a hard disk, an optical disk, an optical-magnetic disk, a CD-ROM, a CD-R, a magnetic tape, a nonvolatile memory card or the like.

Also, it is to be understood that there is included a case where, with the execution of the program code read by the computer, not only the functions of the first to seventh embodiments are realized, but also a part or all of the actual processing is conducted by an OS or the like which runs on the computer on the basis of a command of the program code, and the functions of the first to seventh embodiments are realized by that processing.

In addition, the present invention may be applied to a case in which after the program code read from the storage medium has been written into a memory of a function extension unit connected to an extension function board inserted into the computer or a function extension unit connected to the computer, a CPU disposed in the function extension board or the function extension unit, etc., conducts a part or all of the actual processing on the basis of the command of the program code, and the functions of the first to seventh embodiments are realized by that processing.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing apparatus, comprising:
    a sensor constituted by a plurality of elements each of which converts radiation to an electric signal;
    a plurality of analog-digital converters for converting the electric signals to partial image data for respective partial image data areas;
    a calculation unit which calculates an inclination of a line segment crossing partial image data for respective partial image data areas adjacent to each other, based on inclinations of the partial image data between an edge contacting a boundary of the respective partial image data areas and points which are predetermined distances apart from the edge in the respective partial image data areas, and then calculates a step value based on the inclination; and
    an image sensing means for correcting steps between the adjacent partial image data-which are output from the respective analog-digital converters, based on the step value calculated by the calculation unit to obtain an image data.

2. An image processing apparatus according to claim 1, wherein said plurality of elements output electric signals proportional to an incident X-ray intensity.

3. An image processing apparatus according to claim 1, wherein said image sensing means calculates said step value using only pixel values within a range where input/output characteristics of an X-ray sensor panel are linear.

4. An image processing method for constituting an image from a plurality of partial image data for respective image data areas output from a plurality of analog-digital converters, comprising:

using a processor for processing the steps of:

a step of calculating a step value based on an inclination of a line segment crossing partial image data for respective image data areas adjacent to each other, wherein the inclination is calculated based on inclinations of the partial image data between an edge contacting a boundary of the respective partial image data areas and points which are predetermined distances apart from the edge in the respective partial image data areas; and a step of correcting steps between the adjacent partial image data based on the step value calculated in the calculating step.

5. A computer-readable recording medium, which records a program for causing a computer to execute the method of claim 4.

* * * * *